US011456975B2

(12) United States Patent  (10) Patent No.: US 11,456,975 B2
Kulkarni et al.  (45) Date of Patent: Sep. 27, 2022

(54) COMMUNICATIONS NETWORK CONTROLLER MODULE

(71) Applicant: RENESAS ELECTRONICS CORPORATION, Tokyo (JP)

(72) Inventors: Dnyaneshwar Kulkarni, Duesseldorf (DE); Christian Mardmöller, Duesseldorf (DE)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/348,703

(22) PCT Filed: Nov. 9, 2016

(86) PCT No.: PCT/EP2016/077140
§ 371 (c)(1),
(2) Date: May 9, 2019

(87) PCT Pub. No.: WO2018/086683
PCT Pub. Date: May 17, 2018

(65) Prior Publication Data
US 2019/0288961 A1   Sep. 19, 2019

(51) Int. Cl.
*H04L 49/9057* (2022.01)
*H04N 21/414* (2011.01)
(Continued)

(52) U.S. Cl.
CPC ..... *H04L 49/9057* (2013.01); *H04N 21/41422* (2013.01); *H04N 21/44004* (2013.01); *H04N 21/236* (2013.01)

(58) Field of Classification Search
None
See application file for complete search history.

(56) References Cited

U.S. PATENT DOCUMENTS 5,502,499 A * 3/1996 Birch ............... H04N 21/426
   348/523
6,674,909 B1 * 1/2004 Nakano ........... H04N 21/44004
   348/E5.002

(Continued)

FOREIGN PATENT DOCUMENTS

CN    105577563 A    5/2016

OTHER PUBLICATIONS

Fudruj, Marek, "Fundamentals of Computer Architecture," Dec. 8, 2005, all enclosed pages cited.

(Continued)

*Primary Examiner* — Faruk Hamza
*Assistant Examiner* — Cassandra L Decker
(74) *Attorney, Agent, or Firm* — Burr & Forman LLP

(57) ABSTRACT

A communications network controller module for storing media data in memory is disclosed. The module comprises a media access controller and a message handler. The message handler is configured, in response to receiving a frame comprising frame data from the media access controller, to identify a frame type for the frame, to identify a target queue in dependence upon the frame type, the target queue comprising a series of data areas in memory reserved for storing frames of the frame type, to obtain a current descriptor address of a current descriptor for the target queue, the current descriptor comprising a descriptor type field, a descriptor pointer field and a descriptor data size field, and to obtain an address in the series of data areas, to store a part of the frame data at the data area address. The message handler is configured, in dependence upon determining that a descriptor type held in the descriptor type field indicates the frame data part is to be stored contiguously in the series of data areas, to obtain the address at which to (Continued)

store the frame data part by reading the address from a current incremental address register for the target queue.

18 Claims, 14 Drawing Sheets

(51) Int. Cl.
*H04N 21/44* (2011.01)
*H04N 21/236* (2011.01)

(56) References Cited

U.S. PATENT DOCUMENTS

| | | | | |
|---|---|---|---|---|
| 7,826,469 | B1* | 11/2010 | Li | H04L 47/6215 370/412 |
| 7,958,255 | B1 | 6/2011 | Karighattam et al. | |
| 9,590,910 | B1* | 3/2017 | Pannell | H04L 12/56 |
| 9,736,069 | B1* | 8/2017 | Daniel | H04L 45/74 |
| 2001/0053148 | A1* | 12/2001 | Bilic | H04L 69/22 370/389 |
| 2003/0037154 | A1* | 2/2003 | Poggio | H04L 47/62 709/230 |
| 2008/0285574 | A1* | 11/2008 | Teener | G09G 5/006 370/401 |
| 2009/0310489 | A1* | 12/2009 | Bennett | G06F 13/4278 370/236 |
| 2011/0016284 | A1 | 1/2011 | Balan et al. | |
| 2014/0229636 | A1* | 8/2014 | Broome | H04N 21/845 709/246 |
| 2016/0035399 | A1* | 2/2016 | Yaraduyathinahalli | G11C 7/10 365/189.17 |
| 2016/0191973 | A1* | 6/2016 | Joy | H04N 21/643 725/75 |

OTHER PUBLICATIONS

International Search Report and Written Opinion of PCT/EP2016/077140 dated Jul. 5, 2017, all enclosed pages cited.

Office Action from related CN application No. 201680090708.8 dated Feb. 22, 2021, all enclosed pages cited.

* cited by examiner

COMMUNICATIONS NETWORK CONTROLLER MODULE

FIELD OF INVENTION

The present invention relates to a communications network controller module capable of storing frame data in system memory, particularly, but not exclusively to an Audio Video Bridging (AVB) end station capable of storing frame data in system memory.

BACKGROUND

Several types of advanced driver assistance system (ADAS) have been developed which can aid a driver of a motor vehicle. Such types of ADAS include, among others, lane departure warning, emergency brake assist, adaptive cruise control, blind spot detection and park assist.

These systems tend to employ imaging devices (such as digital cameras) and sensors (for example, ultrasonic proximity sensors) which can generate large volumes of data requiring real-time, low-latency data processing.

As the number of imaging- and sensor-based ADAS and other types of in-vehicle data processing systems increases and the use of high-definition imaging devices becomes more widespread, data processing and storage requirements (for example, in terms of speed, throughput and/or efficiency) of electronic control units (ECUs) and other in-vehicle network devices increases.

SUMMARY

According to a first aspect of the present invention there is provided a communications network controller module, which is preferably a hardware module. The communications network controller module comprises a media access controller and a message handler. The message handler is configured, in response to receiving a frame, such as an Ethernet frame, comprising frame data from the media access controller, to identify a frame type for the frame (for example based on Stream ID) and to identify a target queue in dependence upon the frame type. The target queue comprises a series of data areas in memory reserved for storing frames of the frame type. The message handler is configured to obtain a current descriptor address of a current descriptor for the target queue. The current descriptor comprises a descriptor type field. The current descriptor may also include a descriptor pointer field and a descriptor data size field. The message handler is configured to obtain a data area address in the series of data areas and to store a part of the frame data (such as payload) at the data area address. The message handler is configured, in dependence upon determining that a descriptor type held in the descriptor type field indicates the frame data part is to be stored contiguously in the series of data areas (for example, the descriptor type is FEMPTY_IS or FEMPTY_IC), to obtain the address at which to store the frame data part by reading the address from a first (or "current incremental") address register (for example, a register CIARr.CIA) for the target queue (r).

Thus, the data in the frame data part can be stored contiguously in the series of data areas (the continuous series of data areas herein referred to as "an incremental data area") which means that the data does not need to be re-arranged (for example, by copying the data into another portion of memory as a contiguous section) before it can be read out and/or processed further. This can help to reduce CPU processing load and allow a hardware processor to process the data directly, which can help to reduce latency.

The current incremental address register is preferably a hardware register and may be provided in a set of special purpose registers (SFR).

The message handler may be configured to write a new frame type to the descriptor type field.

The message handler may be configured to store the address in a second (or "last incremental") address register (for example, a register LIARr.LIA) for the target queue. The second address register may be accessible to software. Thus, application software can determine the amount of data stored in in the incremental data area.

The message handler is preferably configured to write a new address in the current incremental address register (for example, the register CIARr.CIA) for the target queue to point immediately after an end of the frame data part so as to allow a next frame data part to be stored contiguously after the frame data part.

The current descriptor address may be obtained from a third (or "current descriptor") address register (for example, from a register CDARr.CDA) for the target queue (r) which points to the current descriptor, and the communications network controller module may be configured, after obtaining the current descriptor address from the current descriptor address register, to update the current descriptor address register to point to a next descriptor. The current descriptor address register is preferably a hardware register and may be provided in the SFR.

The module may be configured to process header frame data using a header descriptor and to process payload frame data using a different, payload descriptor.

The message handler may be configured to store payload data contiguously in the series of data areas and, in response to the header descriptor instructing the message handler to discard the header, to discard the header. The message handler may be configured to store payload data contiguously in the series of data areas and, in response to the header descriptor to instructing the message handler to store the header, to store the header. Headers need not be intentionally stored contiguously, although they end up being stored contiguously since they may be of a fixed sized and the fixed size may correspond to the data area size.

The series of data areas in memory may be reserved for storing payload of the frames of the frame type and the message handler may be configured to store the header in another series of data areas in memory reserved for storing headers of the frames of the frame type.

The frame may be an Ethernet frame. The Ethernet frame may comply with IEEE 1722 Audio/Video Bridging Transport Protocol. The frame may be a TCP/IP frame.

The module may further comprise an unread frame counter. The unread frame counter may be incremented when the frame is added to the queue. The unread frame counter may be decremented when the frame is read by a software application.

According to a second aspect of the present invention there is provided an integrated circuit comprising a module according to the first aspect, a system bus and a central processing unit sub-system in communication with the module via the system bus.

The integrated circuit may be a microcontroller (MCU), a system-on-a-chip (SoC) or an application specific integrated circuit (ASIC). The integrated circuit may include an FPGA.

The integrated circuit may further comprise memory, that is, memory in which frame data is stored.

According to a third aspect of the present invention there is provided a computer system comprising a first integrated circuit according to the second aspect and a second, different integrated circuit providing memory in communication with the first integrated circuit.

Each data area may comprise a positive integer multiple of 32-bit words. The data areas may be arranged as a contiguous block in memory. The descriptor data area of all storage elements in a chain may be located in a continuous memory.

Each frame may contain positive integer multiple of A/V packets, for example one or two A/V packets.

According to a fourth aspect of the present invention there is provided a control unit comprising an integrated circuit according to the second aspect of the invention or a computer system according to the third aspect of the invention.

According to a fifth aspect of the present invention there is provided a system comprising a control unit according the fourth aspect of the invention, at least one data source (for example a digital camera) and a communications network arranged to carry data from the at least one data source to the control unit.

The system may further comprise at least one display coupled to the control unit for displaying frame data. The system may be or be included in an advanced driver assistance system.

According to a sixth aspect of the present invention there is provided a vehicle comprising a system according to the fifth aspect of the present invention. The vehicle may be a motor vehicle. The motor vehicle may be a motorcycle, an automobile (sometimes referred to as a "car"), a minibus, a bus, a truck or lorry. The motor vehicle may be powered by an internal combustion engine and/or one or more electric motors.

According to a seventh aspect of the present invention there is provided a method comprising identifying a frame type for a frame comprising frame data, identifying a target queue in dependence upon the frame type, the target queue comprising a series of data areas in memory reserved for storing frames of the frame type, obtaining a current descriptor address of a current descriptor for the target queue, the current descriptor comprising a descriptor type field, obtaining an address in the series of data areas and storing a part of the frame data at the address. The method comprises, in dependence upon determining that a descriptor type held in the descriptor type field indicates the frame data part is to be stored contiguously in the series of data areas, obtaining the address at which to store the frame data part by reading the address from a current incremental address register (for the target queue The method is preferably a hardware-implemented method.

The method may further comprise receiving the frame.

The method may further comprise providing a last incremental address register for the target queue. The method may further comprise setting the incremental address register equal to the current incremental address register before processing a descriptor.

The method may further comprise writing a new address in the current incremental address register for the target queue to point immediately after an end of the frame data part so as to allow a next frame data part to be stored contiguously after the frame data part.

The current descriptor address may be obtained from a current descriptor address register for the target queue which points to the current descriptor, and the method may further comprise, after obtaining the current descriptor address from the current descriptor address register, updating the current descriptor address register to point to a next descriptor.

According to an eighth aspect of the present invention there is provided a method comprising processing header frame data according to the seventh aspect of the invention using a header descriptor and processing payload frame data according to the seventh aspect of the invention using a different, payload descriptor.

The header descriptor may contain a respective descriptor type which indicates that the header frame data is not to be stored or a respective descriptor type which indicates that the header frame data is to be stored and wherein the header frame data is stored in a header data area. The payload descriptor may contain a respective descriptor type which indicates that the payload is to be stored.

According to a ninth aspect of the present invention there is provided a data structure comprising a chain of descriptors, each descriptor configured to control storage of frame data in memory, each descriptor comprising a descriptor type field, a descriptor pointer; and a frame data size field.

According to a tenth aspect of the present invention there is provided a method comprising processing frame data using the data structure according to the ninth aspect.

BRIEF DESCRIPTION OF DRAWINGS

Certain embodiments of the present invention will now be described, by way of example, with reference to the accompanying drawings, in which.

DETAILED DESCRIPTION OF CERTAIN EMBODIMENTS

Motor Vehicle

Figure 1:
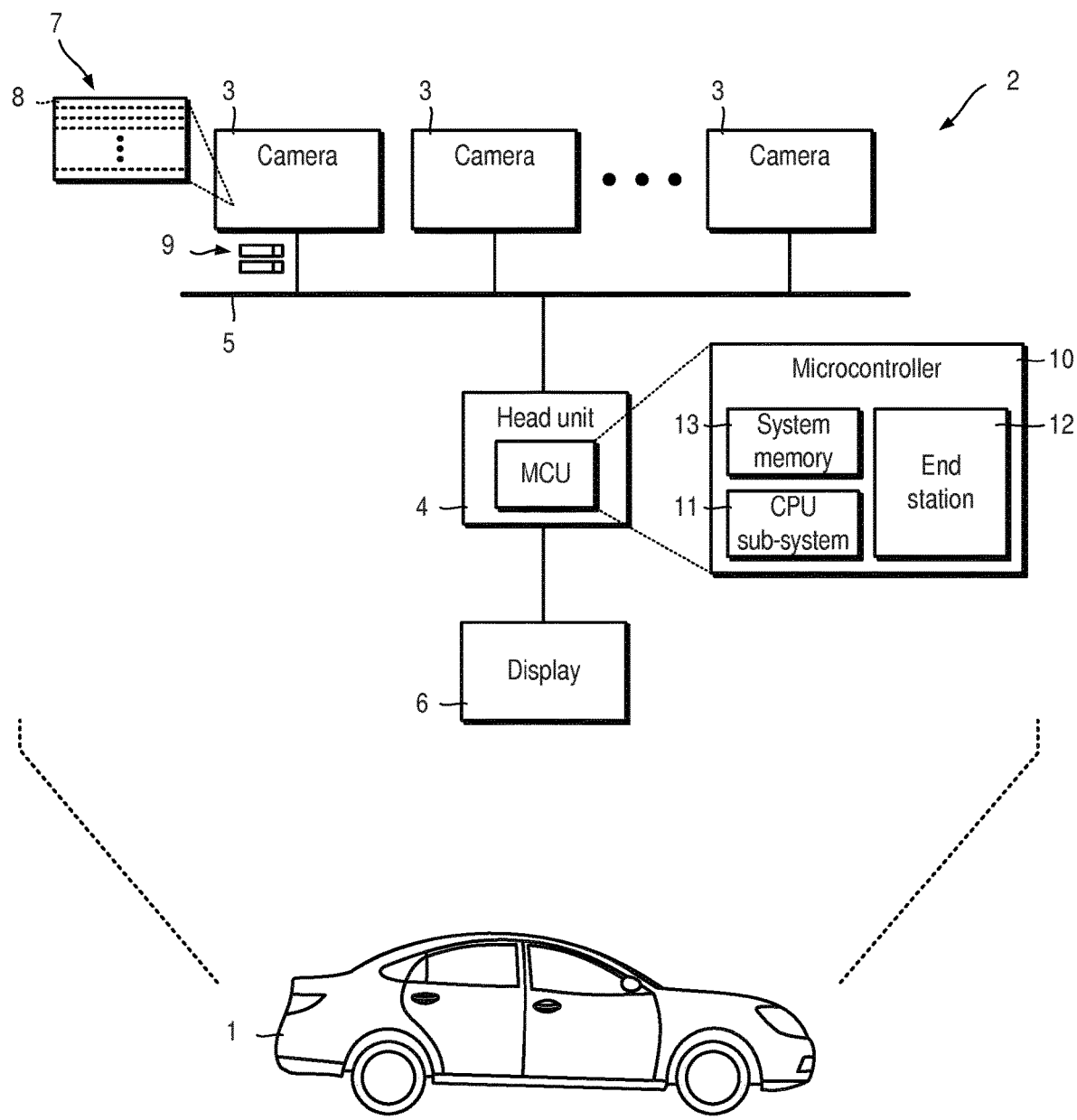
FIG. 1 schematically illustrates a motor vehicle which includes digital cameras, a head unit adapted to process media data from the digital cameras and a display.

Referring to FIG. 1, a motor vehicle 1 is shown which includes an advanced driver assistance system (ADAS) 2, such as a park assist system. The ADAS 2 includes at least one high-definition digital camera 3 and a head unit 4 connected to an in-vehicle communications bus 5. The head unit 4 is connected to a display 6. The display 6 can take the form of a flat-panel display located, for example, in a centre console (not shown) or dashboard (not shown).

Figure 2:
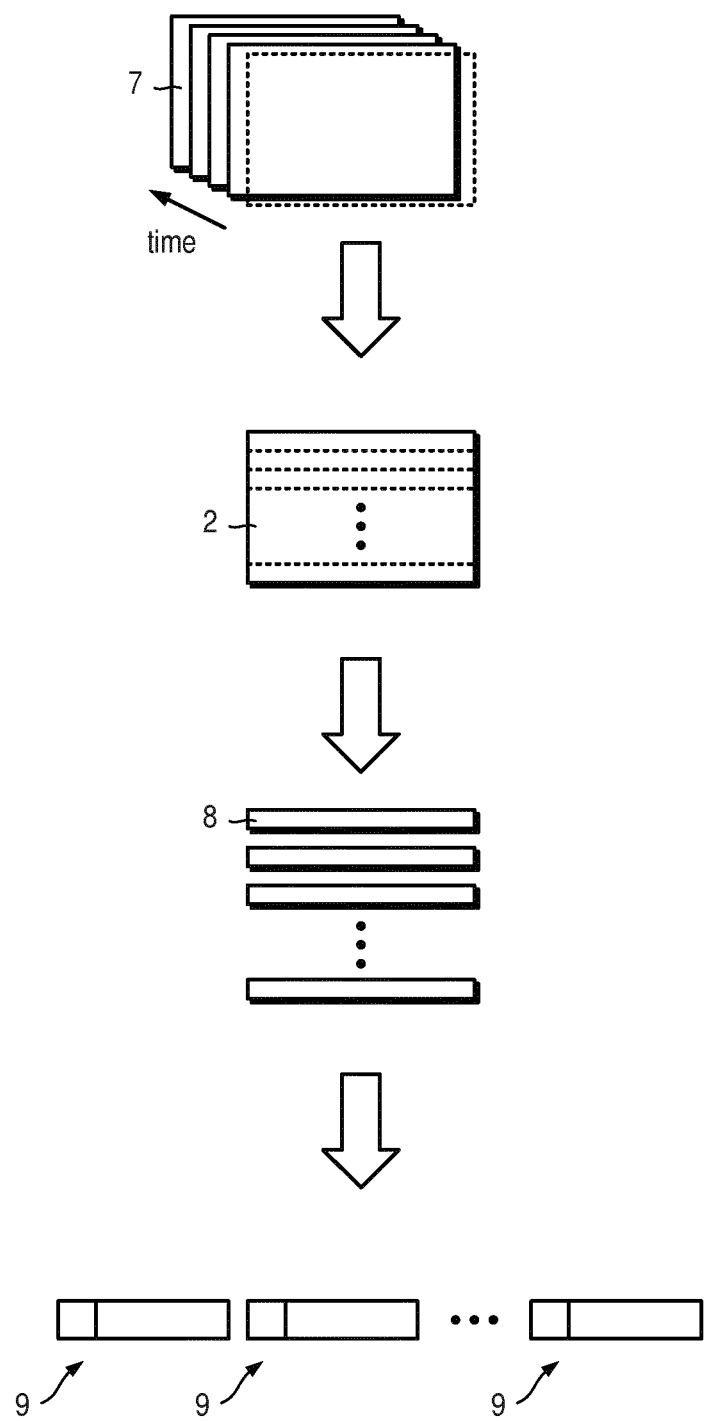
FIG. 2 schematically illustrates slicing and transporting an image generated by a digital camera.

Referring also to FIG. 2, each high-definition digital camera 3 is capable of capturing images in a sequence of image frames 7 (for example, at a rate of 60 fps) and dividing each image frame 7 into one or more slices 8 for processing. Each image frame 7 is sliced, encoded (which may include compression), optionally encrypted, divided into packets (not shown), encapsulated in data containers 9 and transmitted via the in-vehicle communications bus 5 to the head unit 4.

Head Unit

The head unit 4 includes a microcontroller 10 or other similar microprocessor-based system. The microcontroller 10 includes a central processing unit (CPU) sub-system 11 and a hardware-implemented peripheral module in the form of a communications network controller 12 (herein referred to as an "end station"). The microcontroller 10 includes other peripheral modules, such as other communications network controllers (for other different types of communications network), timers etc.

The head unit 4 includes system memory 13 (herein referred to as "user memory" or "URAM") which may be provided on-chip (i.e. on the microcontroller) or by external memory chip(s) (not shown). The memory 13 can take the form of synchronous single-ported RAMS.

The in-vehicle communications bus 5 takes the form of a wired Ethernet network and the data containers 9 takes the form of audio video bridging transport protocol (AVBTP) Ethernet frames 9 (herein also referred to as AVBTP Ethernet packets).

AVBTP Frame Format

Figure 3:
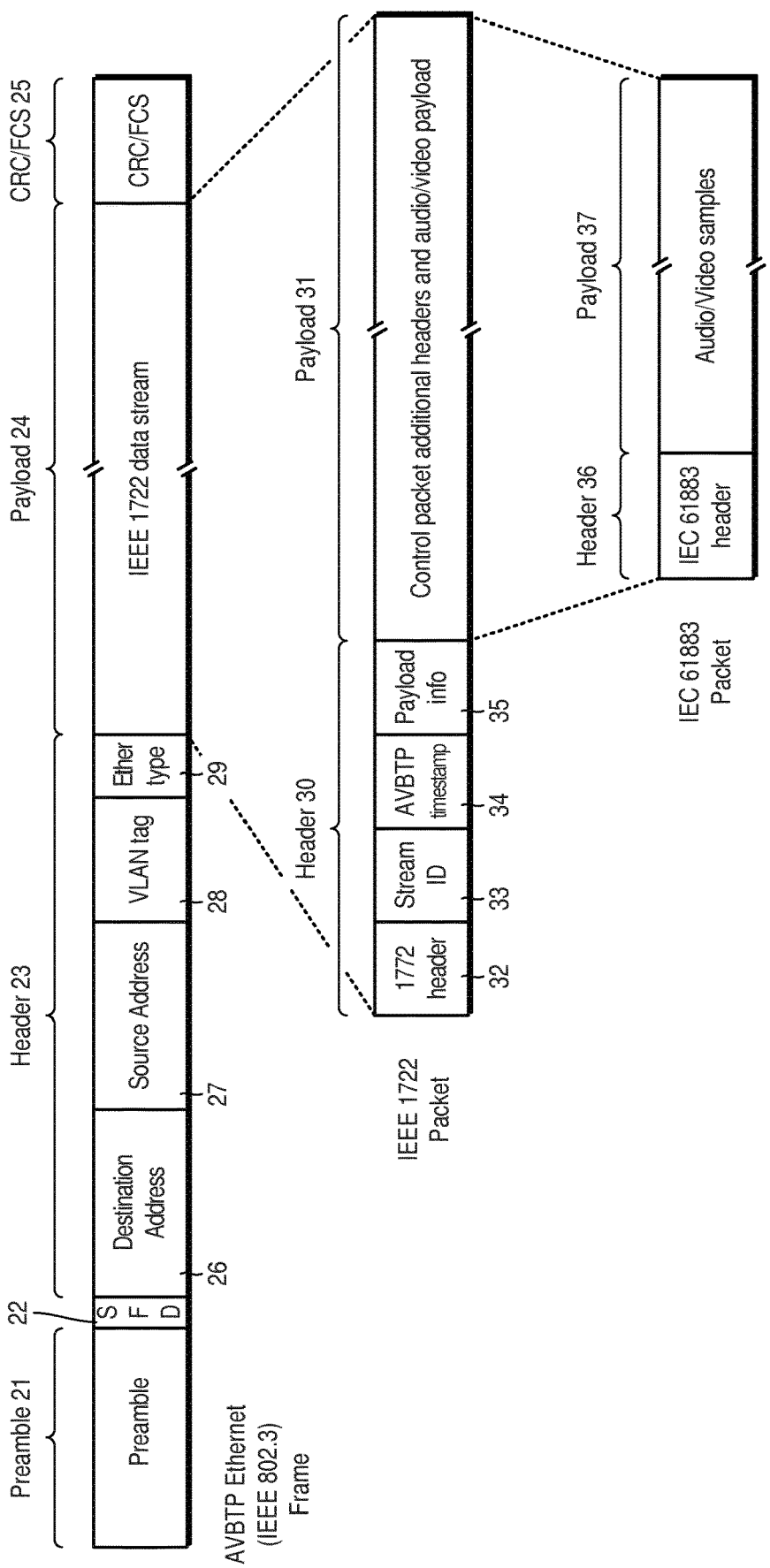
FIG. 3 illustrates an AVBTP Ethernet frame which may be used to transport media data from a digital camera to a head unit.

Referring to FIG. 3, an AVBTP frame 9 is shown, which may be preceded by a preamble 21 and a start-of-frame delimiter (SFD) 22, and which comprises an 18-byte Ethernet header 23, a payload 24 which comprises 0 to 1500 bytes of data and a 4-byte frame check sequence (FCS) 25. The frame 9 has a minimum length of 64 bytes. The header 23 comprises a 6-byte destination address 26, a 6-byte source address 27, a 4-byte VLAN tag 28 and a 2-byte Ethernet tag 29.

The payload 24 comprises an IEEE 1772 packet which includes a header 30 and payload 31 which can comprise 0 to 1476 bytes. The header 30 includes a 4-byte 1772 header 32, an 8-byte stream identifier 33, and AVBTP timestamp 34 and payload information 35 and additional header and payload 36. The 1772 header 30 includes subtype data (not shown) which includes a stream ID valid (SV) bit (not shown) and a three-bit 1722 version (not shown).

The additional header and payload 31 comprises an IEC 61883 audio/video packet which includes an 8-byte IEC 61883 header 36 and payload 37 which can comprise 0 to 1468 bytes.

Other types of data packet (other than AVBTP Ethernet packet), other types of encapsulated packet (other than IEEE 1722 packet) and other types of media packet (other than IEC 61883) may be used.

Microcontroller

Figure 4:
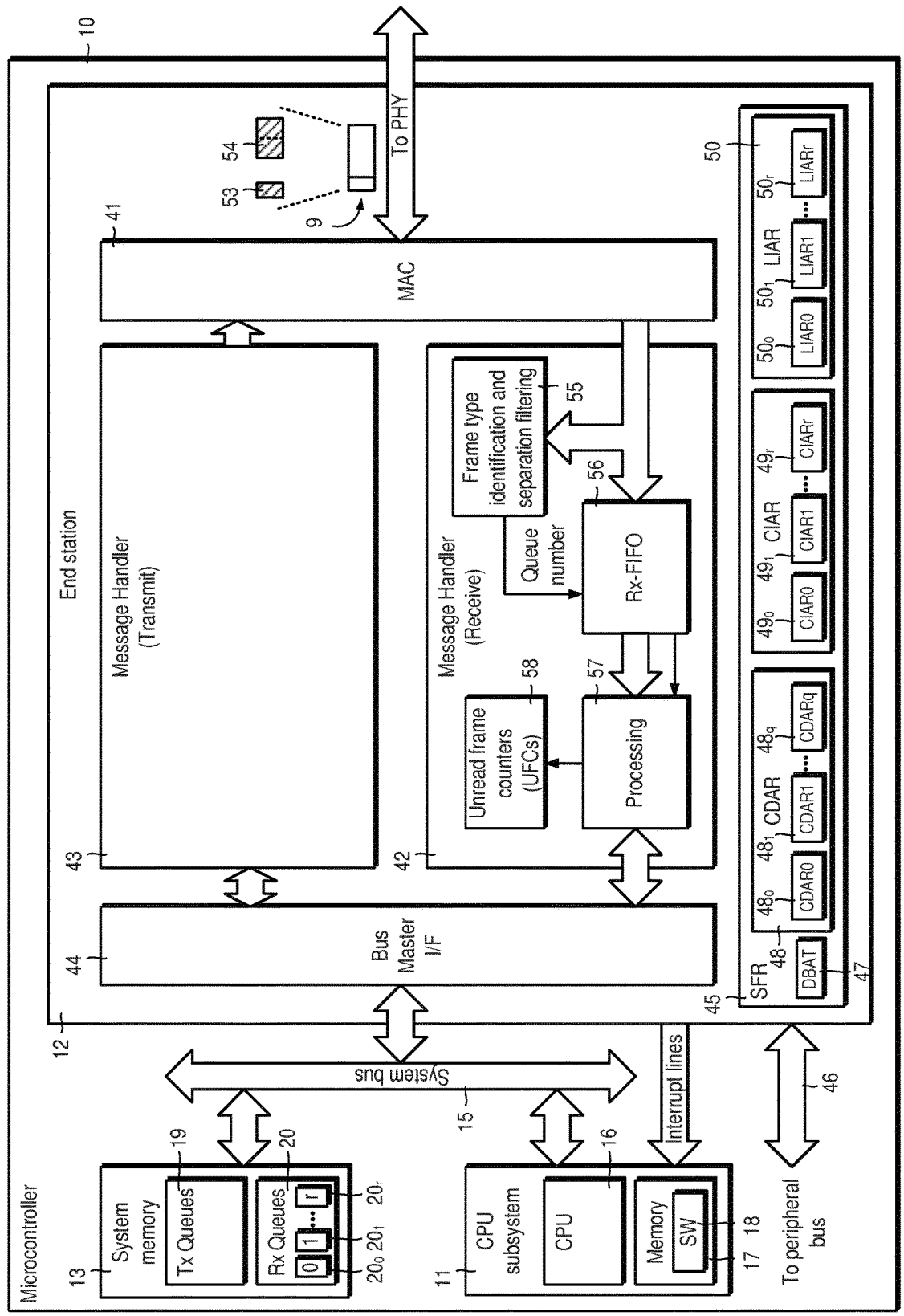
FIG. 4 is a block diagram of a microcontroller which includes a CPU sub-system, an end station and system memory.

Referring to FIG. 4, the microcontroller 10 is shown in more detail.

The microcontroller 10 includes the CPU sub-system 11, the end station 12 and system memory 13 interconnected by a system bus 15. The CPU sub-system 11 includes one or more CPUs 16 (herein, for clarity, reference will be made to a CPU 16) and memory 17 storing application software 18. The CPU 16 loads and executes the application software 18. The system memory 13 is used to store data in transmit queues 19 and receive queues 20.

End Station

Referring still to FIG. 4, the end station 12 includes a media access controller (MAC) 41, a receive message handler 42, a transmit message handler 43 and a bus master interface 44. The MAC 41 is connected to an external physical layer transceiver (PHY) (not shown). The end station 12 has direct memory access capability. The end station 12 can transfer data between the MAC 41 and system memory 13 without CPU intervention.

The end station 12 may include a start of frame detector (not shown) which can be used to capture a time stamp of a frame and timing block (not shown), for example, in the form of a generalized Precision Time Protocol (gPTP) block, which can be used to provide a receive timestamp to the receive message handler 42.

The end station 12 also includes a special function register (SFR) 45. The end station 12 is controlled by the CPU 16 by a peripheral bus interface 46 via the SFR 45.

The SFR 45 includes (among other registers) a descriptor base address table register 47 (herein referred to as "DBAT"), a set of current descriptor address registers 48 (herein referred to as "CDARs"), a set of current incremental address registers 49 (herein referred to as "CIARs") and a set of last incremental address registers 50 (herein referred to as "LIARs").

The DBAT 47 contains a 32-bit address ("DBAT.TA") of a first entry $52_0$ (FIG. 8) of a descriptor base address table 51 stored in system memory 13.

There are q current descriptor address registers $48_0$, $48_1$, ..., $48_q$, where q=0 to 21. In this case, there are four transmit queues, i.e. t=q for q=0, 1, 2, 3 and 18 receive queues, i.e. r=q−4, for q=4, 5, ..., 22. Each current descriptor address registers $48_0$, $48_1$, ..., $48_q$ holds a respective 32-bit address ("CDARq.CDA") for the queue q.

There are r current incremental address registers 49 and r last incremental address registers 50. Each current incremental address registers $49_0$, $49_1$, ..., $49_r$ holds a respective 32-bit address ("CIARr.CIA") for queue r where currently frame data is stored or where frame data will be stored when queue r becomes active. Each last incremental address registers $50_0$, $50_1$, ..., $50_r$ holds a respective 32-bit address ("LIARr.LIA") for queue r which the first, not-used address inside an incremental data area of receive queue r. There may be fewer or more transmit queues 19 and, thus, fewer or more current descriptor address registers 48. There may be fewer or more receive queues 20 and, thus, fewer or more current descriptor address registers 48, current incremental address registers 49 and last incremental address registers 50.

As will be explained in more detail later, these registers 47, 48, 49, 50 are used to allow data to be selectively stored either non-continuously in a series of fixed-size areas (or "blocks") of memory which might leave gaps between data due to the fact that the data can vary in size and, thus, not fill the block of memory or contiguously, without any gaps between data in memory, in a so-called "incremental data area".

This arrangement also allows header data 53 and payload data 54 contained in frame 8 to be stored separately, although header data 53 can be discarded.

Referring also to FIG. 3 again, the header data 53 and payload data 54 can be, for example, the Ethernet frame header 23 and payload 24 respectively of the Ethernet frame 9. However, the header data 53 and payload data 54 can headers and payloads contained in the Ethernet frame 9 such as, for example, the 1772 packet header 30 and payload 31 respectively.

The message handler 42 includes a frame-type identification and separation filtering block 55, a receive buffer 56 in the form of a first-in, first-out (FIFO) buffer, a processing unit 57 and an unread frame counter 58. The processing unit 57 performs queue-specific descriptor chain processing and flagging.

Descriptors

Descriptor Storage in System Memory

Figure 5:
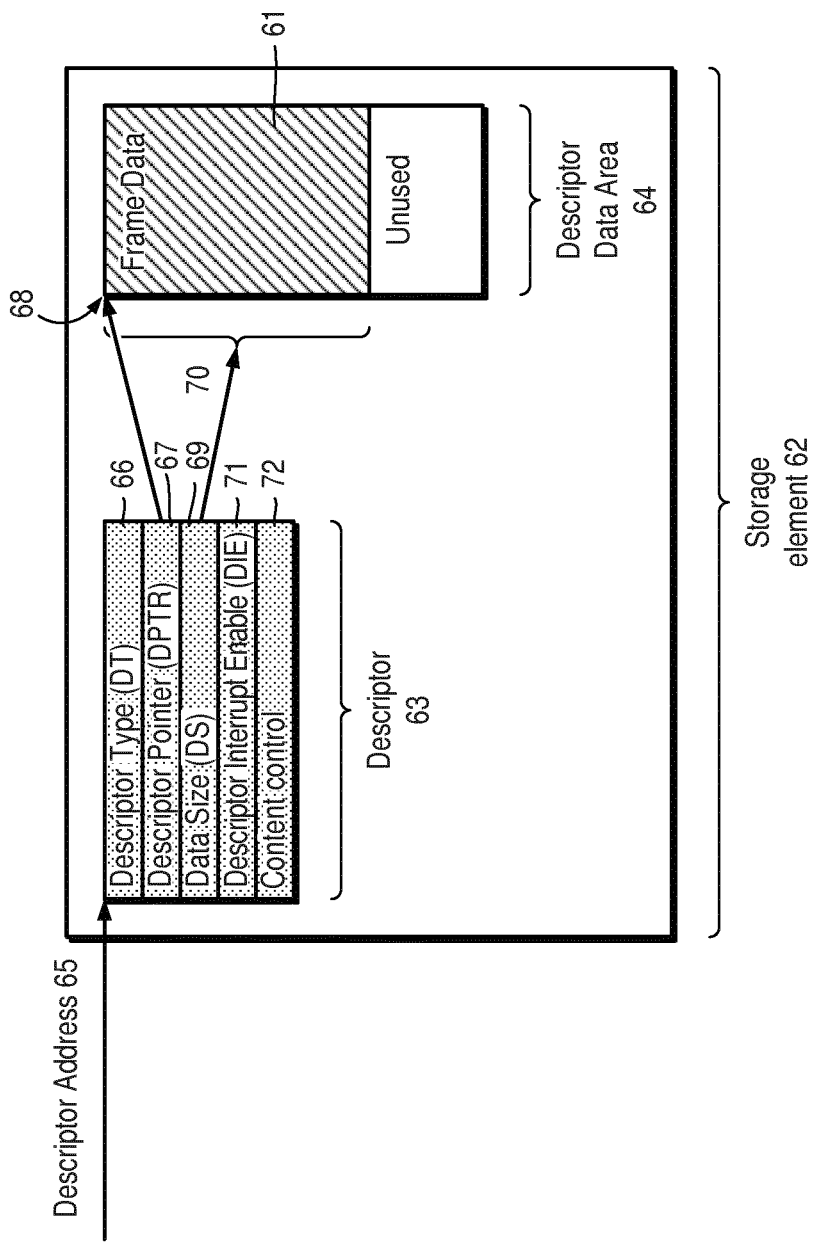
FIG. 5 is a schematic block diagram of a storage element which include a descriptor and descriptor data area.

Referring also to FIG. 5, the end station 12 exchanges receive and transmit frame data 61 with application software 18 using data structures 62 (herein also referred to as "storage elements") located in system memory 13. The frame data 61 may be header data 53 or payload data 54. If both type of frame data 61 is stored two sets of storage elements 62 are used, namely one for header data 53 and one for payload data 54.

A storage element 62 consists of a control structure 63 (referred to herein as a "descriptor") and an area 64 where the frame data 51 is located (referred to herein as "descriptor data area" or simply "data area").

Splitting a storage element 62 into control and data areas 63, 64 allows flexible allocation of frame data 61 in system memory 13. For example, frame data 61 can be stored contiguously in system memory 13 directly without, for example, the need to store the data in non-continuous block in one portion of memory and then copy the data into contiguous blocks in another portion of memory. Using a descriptor 63 can also help to realize arbitration of hardware and software access to the storage element 62.

A descriptor 63 starts at a descriptor address 65 and consists of a descriptor type field 66 (herein also referred to as "DESC.DT") controlling the function of the storage element 62, a descriptor pointer 67 (herein also referred to as "DESC.DPTR") defining the first address 68 of the descriptor data area 64 containing the frame data 61 and a frame data size field 69 (herein also referred to as "DESC.DS") defining the size 70 of the frame data 61. The descriptor 63 also contains a descriptor interrupt enable field 71 (herein also referred to as "DESC.DIE") controlling when the descriptor 63 can issue a descriptor interrupt when it has been processed. Additionally, a descriptor 63 can include content-related fields 72.

Storage of descriptors 63 in system memory 13 is aligned, for example, at 32-bit intervals. Storage of frame data 61 in the descriptor data area 64 is not restricted.

A normal type of descriptor 63 has a size of two long words, i.e. 64 bits. An extended type of descriptor 63, for example which handles reception using a gPTP timestamp, can have a size of five long words, i.e. 160 bits.

The frame size data field 69 defines the size 70 of the frame data 61. In the case of empty storage elements 62 which are prepared for reception, the frame size data field 69 defines the maximum frame data size which can be stored in the descriptor data area 64.

The descriptor data area 64 consists of a multiple of 32-bit words. If the descriptor pointer 67 is not aligned to a 32-bit address, preceding bytes are not changed when end station 12 writes to descriptor data area 62.

Descriptor Chains for Queues

As mentioned earlier, storage elements 62 for reception and transmission are grouped in queues 19, 20. A queue 19, 20 provides a function to handle one or more frames.

The transmit queues 19 include a plurality of queues $19_0$, $19_1, \ldots, 19_t$ where t is a positive integer equal to or greater than 2. For example, t may be 3. The receive queues 20 include a plurality of queues $20_0, 20_1, \ldots, 20_r$ where r is a positive integer equal to or greater than 2. For example, r may be 17.

A string of combined storage elements is referred to herein as a "descriptor chain".

To support flexible designs of descriptor chains, three categories of descriptor types (i.e. DESC.DT) can be defined, namely (1) descriptors defining frame data, (2) descriptors controlling the descriptor chain itself, such as LINK and EOS, which are hereinafter described in more detail and (3) descriptors which arbitrate access by hardware or software.

Figure 6:
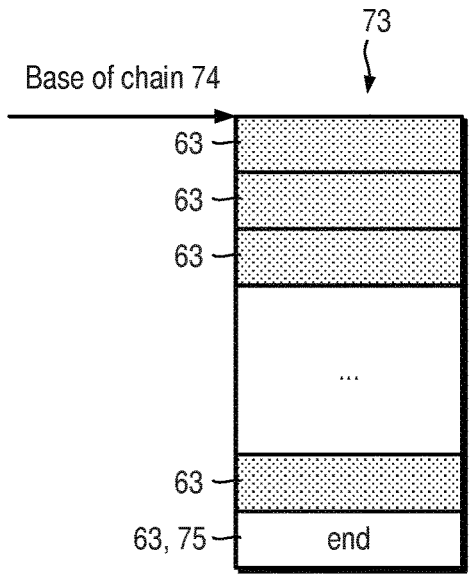
FIG. 6 illustrates a linear descriptor chain.
Figure 7:
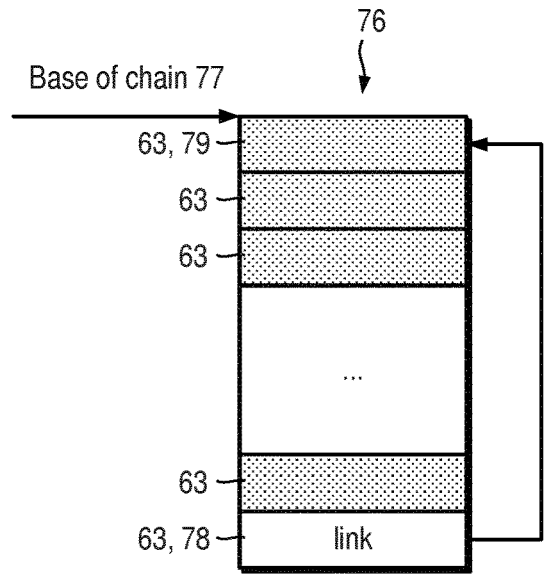
FIG. 7 illustrates a cyclical descriptor chain.

Referring to FIGS. 6 and 7, two basic descriptor chain topologies can be used.

Referring in particular to FIG. 6, a linear descriptor chain 73 is shown. The linear descriptor chain 73 has a base of chain address 74. The last descriptor 63, 75 in the array is an arbitration descriptor, e.g. EEMPTY, to mark the end of the descriptor chain.

Referring to FIG. 7, a cyclic descriptor chain 76 is shown. The cyclic descriptor chain 76 has a base of chain address 77. The last descriptor 63, 78 in the array is a control descriptor, e.g. LINK, directed back to the first descriptor 63, 79 in the chain.

The relation between a queue and a descriptor chain is realized by the base of chain address 74, 77. A queue $19_0$, $19_1, \ldots, 20_0, 20_1$ (FIG. 4) is connected to one descriptor chain at time, but there are mechanisms available to switch between different chains during operation.

There is no restriction as to the number and position of link descriptors inside a chain 73, 76. So a chain 73, 76 can consist of a set of descriptor arrays connected by link descriptors. The last descriptor 75, 78 of a chain 73, 76 defines the topology.

The choice of chain structure and topology depend on application requirements structure.

—Descriptor Base Address Table—

Figure 8:
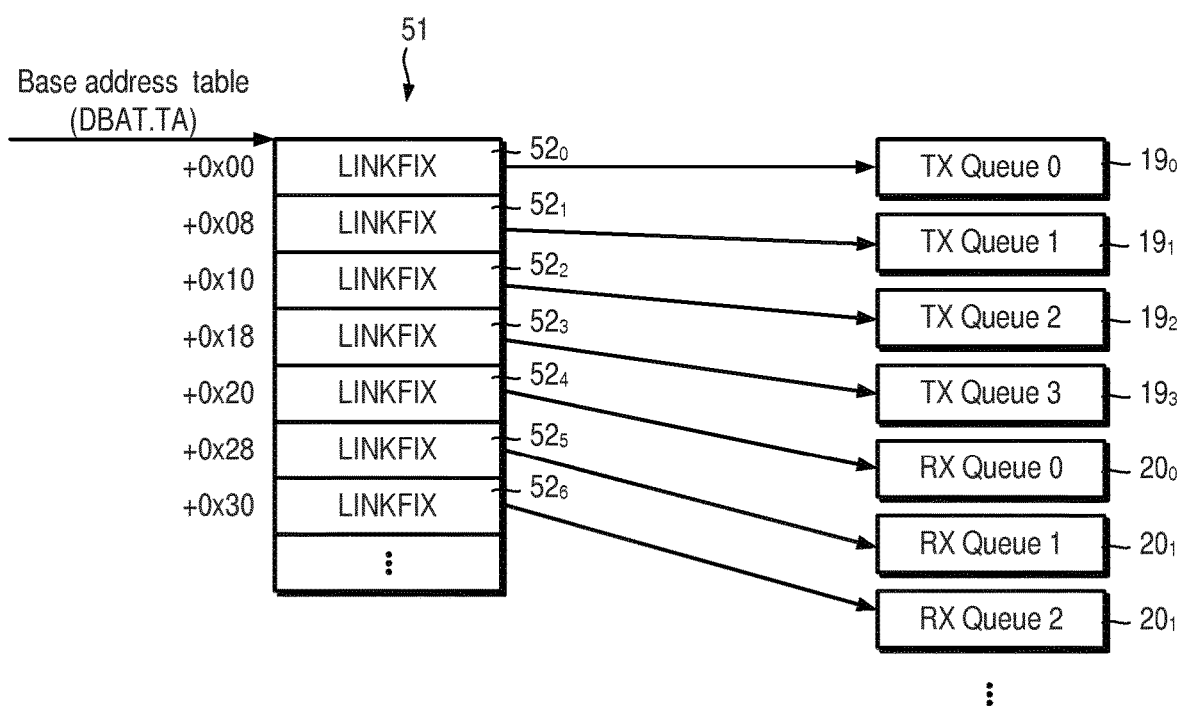
FIG. 8 illustrates a base address table for reception and transmit queues.

Referring to FIG. 8, a descriptor base address table 51 located in system memory 13 defines the address of the first descriptor 63 of each queue. First, second, third and fourth entries $52_0$, $52_1$, $52_2$, $52_3$ are used to access first, second, third and fourth transmit queues $19_0$, $19_1$, $19_2$, $19_{33}$ respectively. Fifth, sixth and seventh (and subsequent) entries $52_4$, $52_5$, $52_6$, ... are used to access the first, second and third (and subsequent) receive queues $20_0$, $20_1$, $20_2$, ....

The base address table entries $51_0, \ldots, 51_6, \ldots$ have the same format as link descriptors 63 (FIG. 5). The descriptors in the base address table 51 have a size of 8 bytes. Thus, the second entry $52_1$ is found at DBAT.TA+0x08, the third entry is $52_2$ is found at DBAT.TA+0x10 and so on. However, extended descriptors, having a size of, for example, 20 bits, can be used.

As will be described in more detail hereinafter, a LINK-FIX descriptor type can be used. This type of link descriptor is not invalidated by the end station 12 after processing and so no software refresh is required. Hardware/software synchronization is preferably done by the first descriptor of the chain. If an application requires hardware/software synchronization for the base address, then a descriptor type LINK can be used. The CPU 16 (FIG. 4) preferably uses LINKFIX or LINK descriptor type for the descriptors located in the base address table.

—Descriptor Chain Processing—

Referring still to FIGS. 4 and 5, the descriptor that is currently being processed or will be processed when the related queue becomes active is referred to as the "current descriptor". The address of the current descriptor used by queue q can be read from CDARq.CDA in CDARq $48_q$ stored in the SFR 45.

The current descriptor address CDARq.CDA is updated during descriptor chain processing. Descriptor chain processing is decoupled from data transfer. Reading of a descriptor 63 may be carried out before processing the descriptor data area 64. However, writing of a descriptor 63 happens once a storage element 62 has been processed completely.

Figure 9:
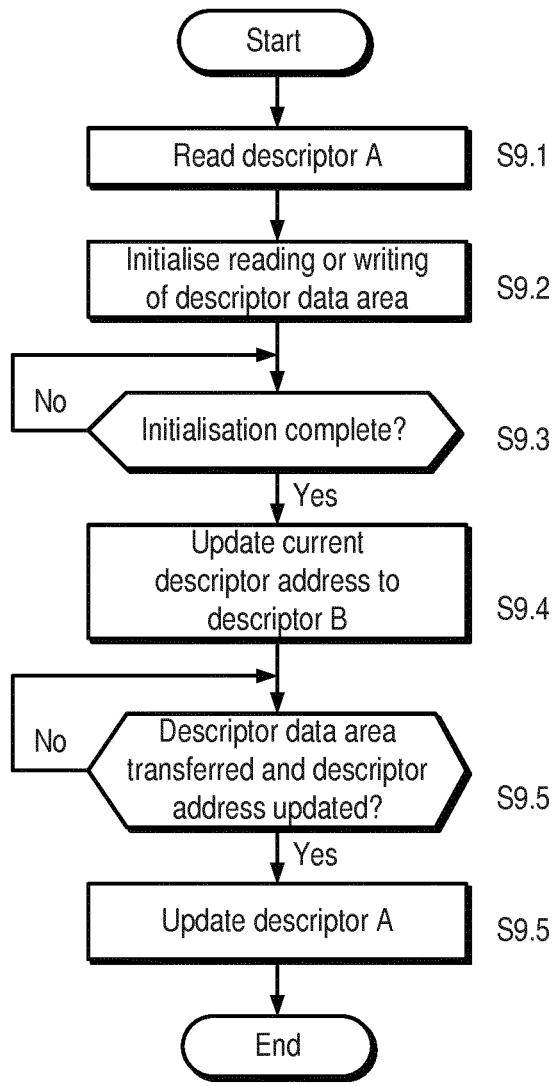
FIG. 9 is a process flow diagram of a method of processing a storage element.

Referring also to FIG. 9, the end station 12, in particular the processor 57, processes a storage element 62 as follows.

Read a first descriptor 62 (step S1). Initialize reading or writing the corresponding descriptor data area 64 (step S2). If initialization of reading/writing descriptor data area 64 has been completed (step S3), update the current descriptor address to the next, second descriptor (step S4). Once the descriptor data area 64 has been transferred and descriptor address has been updated (step S5), update the first descriptor (step S6). This process will be described in more detail.

Descriptor Interrupt

Referring in particular to FIG. 5, each storage element 62 can issue a descriptor interrupt after processing. The descriptor interrupt enable 71 can disable generation of a descriptor interrupt flag (not shown) or enable one of the descriptor interrupts flags (not shown) to be generated.

The end station 12 can use two types of descriptor interrupt. One type is a queue-specific descriptor interrupt. One queue-specific descriptor interrupt is assigned per receive and transmit queue 20, 21. Another type is a universal descriptor interrupt. Fifteen universal descriptor interrupt can be shared between all receive and transmit queues.

—Queue Specific Descriptor Interrupt—

As mentioned earlier, there is one queue specific descriptor interrupt for each receive and transmit queue 20, 21. This relationship (i.e. between interrupt and queue) allows application software 18 to directly process a notification.

When the end station 12 has processed a descriptor where the descriptor interrupt enable 71 is set (i.e. to 0001b), then a related queue specific interrupt flag in the SRF 45 is set to 0001b. For example, a transmit descriptor processed flag (not shown) for the $t^{th}$ queue flags the descriptor interrupt for the $t^{th}$ transmit queue 19 and a receive descriptor processed flag (not shown) for the $r^{th}$ receive queue flags the descriptor interrupt (not shown) for the $r^{th}$ receive queue.

A processed descriptor with the descriptor interrupt enable 71 set can also trigger the universal descriptor interrupt. To prevent concurrent interrupt notification to CPU 16, a descriptor processed interrupt control register is reset (i.e. to 0000b) when using a queue specific interrupt.

—Universal Descriptor Interrupt—

A universal descriptor interrupt is a common resource shared between receive and transmit queues. The software-controlled selection of a descriptor interrupt allows a flexible application specific flagging scheme.

Descriptor Types

Table 1 below gives an overview of the descriptor types used by the end station 12. The first column shows the descriptor type name and the second column a 4-bit number which is written to the descriptor type field 66. Because the direction of data transfer is opposite in transmit and receive queues, the handling of a descriptor type can differ. However, handling of descriptor type is only given for reception. "SW" means that the storage element 62 is assigned for software usage and so the CPU 16 is allowed to access/modify descriptor and descriptor data area, "HW" means that the storage element 62 is assigned for hardware usage, i.e. by the end station and "HW*" means that software can update descriptor even if it is assigned for HW usage.

TABLE 1

| Name | Value | Description | Reception |
|---|---|---|---|
| Frame control | | | |
| FSTART | 5 | Frame Start Storage Element has valid frame data. Frame starts with this data and continues in next descriptor | SW |
| FMID | 4 | Frame Middle Storage Element has valid frame data. Frame has started with a previous descriptor and continues in next descriptor | SW |
| FEND | 6 | Frame End Storage Element has valid frame data. Frame has started with a previous descriptor and ends with this data | SW |
| FSINGLE | 7 | Frame Single Storage Element has valid frame data of a complete frame | SW |
| Chain control | | | |
| LINK | 8 | Link Control element defining next descriptor in chain | HW |
| LINKFIX | 9 | Fixed Link Same as LINK, but not changed by end station after processing | HW* |
| EOS | 10 | End Of Set Control element to synchronize descriptor chain | HW |
| Hardware/software arbitration | | | |
| FEMPTY | 12 | Frame Empty Frame data related descriptor without valid frame data | HW |
| FEMPTY_IS | 13 | Frame Empty Incremental Start Frame data related descriptor without valid frame data. DESCR.DPTR defines base address of the incremental data area in URAM | HW |
| FEMPTY_IC | 14 | Frame Empty Incremental ContinueFrame data related descriptor without valid frame data. Data is stored to incremental data area in URAM | HW |
| FEMPTY_ND | 15 | Frame Empty No Data storage Frame data related descriptor without valid frame data. Processed like FEMPTY but no data is stored in URAM | HW |

TABLE 1-continued

| Name | Value | Description | Reception |
|---|---|---|---|
| LEMPTY | 2 | Link Empty Link descriptor processed by RAVBES | SW |
| EEMPTY | 3 | EOS Empty EOS descriptor processed by RAVBES. Also used to identify end of linear descriptor chain | SW |

—Use of Frame Data Descriptor—

As will be explained in more detail later, some applications do not employ a common length of Ethernet frame 9 (or other type of frame). To minimize memory allocation for frame data, the end station 12 supports the splitting frame data to different descriptors.

This function allows processing of frames which are longer than the descriptor data area 64 (FIG. 5). Furthermore, this allows an application to split frames based on frame data structure, such as, for example, one descriptor is used for storing frame header information and another for the frame payload.

As set out in Table 1 above, four descriptor types are defined for controlling frame data and splitting.

Figure 10:
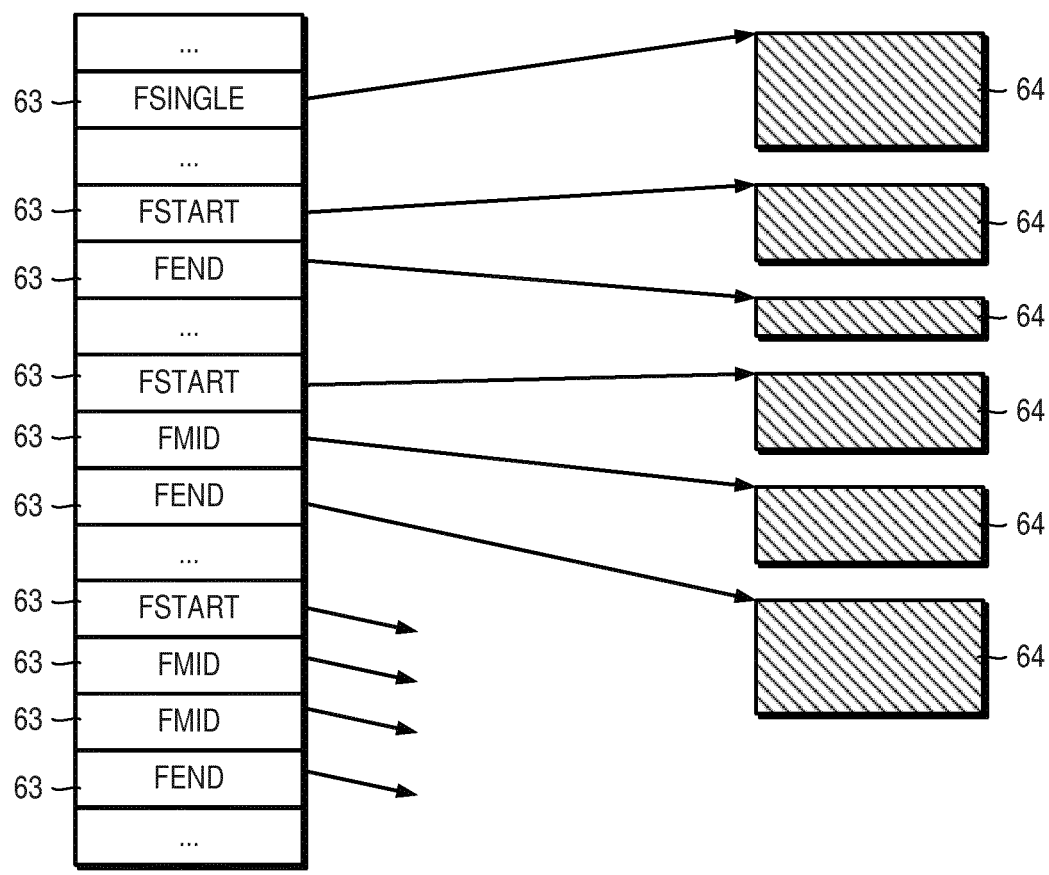
FIG. 10 illustrates frame data mapping.

Referring to FIG. 10, frame data descriptors 63 and corresponding descriptor areas 64 are shown in four situations in which between one to four descriptors are used. The descriptor data areas 64 can be distributed in the system memory 13 (FIG. 4). Alternatively, the descriptor data areas 64 can be arranged into a continuous memory area. When a frame is split to more than four parts, additional FMID descriptors 63 are added.

—Use of Chain Control Descriptors—

Link Descriptors

By using link descriptors, the topology of descriptor chain can be configured.

When using a LINK descriptor, the hardware (i.e. the end station 12) changes the descriptor type to LEMPTY. Thus, the software still has information that the descriptor point related to a descriptor address. The hardware does not update the descriptor when processing a LINKFIX.

The software is allowed to modify descriptor interrupt enable and/or the descriptor pointer of a LINKFIX descriptor. The descriptor type itself cannot be changed in this situation. When changing descriptor pointer, a current descriptor address (not shown) in the current descriptor address register (not shown) in the SFR 45 can be used to get information if old or new chain is used.

EOS Descriptor

By using the EOS descriptor, the CPU splits a descriptor chain into different segments. The queue continues after the EOS descriptor.

Storage of a split frame (when storing FMID, FEND) is aborted and the queue full interrupt is generated. At all other positions the EOS descriptor has no effect. Frame storage starts in the storage element after EOS.

—Use of Hardware and Software Arbitration Descriptors—

The end station provides a set of empty descriptor types, namely FEMPTYxxx, LEMPTY, EEMPTY, to distinguish between different descriptor types before hardware processing. In this way, the CPU 16 can identify required actions (e.g. free of data area) when using storage element next time.

FEMPTYxxx

These descriptor types, namely FEMPTY, FEMPTY_IS, FEMPTY_IC, FEMPTY_ND, are used for frame data related descriptors, which currently have no valid data.

The descriptor pointer of a FEMPTYxxx descriptor refers to a descriptor data area

LEMPTY

This descriptor type is used for processed LINK descriptors. The descriptor pointer of an LEMPTYdescriptor refers to a descriptor.

EEMPTY

This descriptor type is used for processed EOS descriptors. The descriptor pointer of an EEMPTYdescriptor is unused.

—Synchronization Between Hardware and Software Descriptor Access—

Primary hardware and software synchronization uses the descriptor type (i.e. DESCR.DT) located in system memory 13. Using this, the number of CPU accesses to the SFR 45 of the end station 12 can be minimized and performance can be increased.

The primary synchronization scheme is based on the two principles. First, a set of descriptor types is assigned for exclusive use by either hardware or by software (see Table 1 above). Secondly, one side (i.e. hardware or software) is unable to modify a descriptor assigned to the other side.

Thus, the software side processes all information of a storage element 62 before changing the descriptor type. When a hardware side descriptor type has been written to descriptor type field 66 (FIG. 5), the CPU 16 is not able to modify parts of a storage element.

The primary synchronization scheme can be used for all kind of applications.

Beside this primary synchronization scheme, special operation modes may be available. These modes can allow a reduced number of memory accesses by for special application scenarios.

The synchronization scheme is configurable for each queue individually by a receive synchronization mode bits (not shown) in a reception queue configuration register (not shown).

Frame Reception

Referring again to FIGS. 4 and 5, the end station 12 transfers data between the MAC 41 and system memory 13 without CPU intervention. This is achieved using the descriptor mechanism hereinbefore described.

The CPU 16 prepares storage elements 62 defining the location and amount of frame data 61, for example, payload data 54, to be stored. When the MAC 41 receives a frame 9, the storage elements 62 are filled with the received frame data 61. The status of reception can be signalled to the CPU 16.

The receive message handler 42 employs a separation process to classify received frames 9. A frame type identification unit and separation filtering unit 55 is used to identify a frame type (e.g. network, AVB stream, etc.), provide information on how the frame should be processed and provide a queue number r for the frame data 61. Frame types can include network (i.e. compliant with IEEE 802.1AS), AVB stream (i.e. compliant with IEEE 1722) and non-AVB frames, and frame type processing can include whether a frame should be discarded or handled using best efforts.

Based on this classification, received Ethernet frames 9 are stored in the different receive queues 20. The CPU 16 can prioritize different classes of received frames 9.

A frame 9 received by the MAC 41 is initially stored in the end station internal FIFO 56. In parallel, the frame 9 is analyzed to identify the frame type and target queue number. After the MAC 41 completes reception, the target queue number is generated and stored in the Rx-FIFO 56 to be used later when the frame 9 is stored in system memory 13. Reception flagging depends on the storage of the frame into one of the receive queues in system memory 13. An unread frame counter (UFC) 58 is used for frame storage.

Receive Queue Selection

The end station 12 selects a receive queue $20_0$, $20_1$, ..., $20_r$ for storage of received frames 9 on the basis of a flexible separation filter mechanism. The end station 12, in particular the processing module 55, is able to store received frames 9 in system memory 13

The end station 12 can discard received frames 9 during normal operation in a number of circumstances. For example, the end station 12 can discard a frame 9 if the MAC 41 detects any faults during reception, if the frame 9 fails the separation filter, if the frame is a broadcast frame and/or there is a problem during storage, for example, due to an allocated queue being full.

A final decision is made when the frame reception is completed by the MAC 41. When this occurs, the frame 9 is committed to Rx-FIFO 56 for storage in an appropriate receive queue 20 or discarded from Rx-FIFO 56.

—Separation Filter 55—

The separation filter 55 selects one of the stream queues $20_0, 20_1, \ldots, 20_r$ based on the content of a received Ethernet frame 9. The separation filter 55 can be used by itself or in combination with IEEE 1722 Ethernet stream frame filtering.

A separation filter offset register (not shown) in the SFR 45 stores a first byte position configuration parameter (not shown) which selects the position inside the received frames 9 used for separation filtering. Using this byte position, the separation filter 55 can check up to 64 bits (i.e. 8 consecutive bytes) to select a stream queue $20_0, 20_1, \ldots, 20_r$. A separation filter offset register (not shown) in the SFR 45 stores a common filter mask (not shown) which can restrict the separation filtering to a lower number of bytes or to a freely configurable bit mask.

The separation filter 55 can be initially configured in a configuration mode. However, it may be possible to change filter configuration during operation mode.

—Stream Separation Support—

The end station 12 can support received stream frame separation using a flexible separation filter 55. In an AVB network in which there are talker(s) and listener(s), different audio-video streams can be distinguished using the eight-byte Stream ID 33 (FIG. 3). A talker is an end station generating one or more streams and a listener is an end station acting as sink for at least one stream. The Stream ID 33 (FIG. 3) is typically a unique pattern in an AVB network identifying one stream.

A talker can be an end station (not shown) in a camera 3 (FIG. 1) and the listener can be the end station 12 in the head unit 4 (FIG. 1).

According to IEEE 1722 frame layout, the Stream ID field 33 (FIG. 3) starts at byte 23. Thus, the first byte position configuration parameter (not shown) can be set to 22 (decimal) for IEEE 1722 stream separation.

The (8-byte) Stream ID 33 (FIG. 3) can be split into a (e.g. 6-byte) talker source address (not shown) and a (e.g. 2-byte) Unique ID (not shown). The Unique ID (not shown) can be used to distinguish among multiple streams sourced by same talker. Thus, it is possible to separate each stream to an individual queue or separate streams from each talker to an individual queue.

Descriptor Mechanism for Reception

Table 2 below lists descriptor types and the action taken by the end station 12 when it processes a storage element 62. Reference to "next descriptor" is intended to mean the next descriptor in a descriptor chain after the end station 12 has set the current descriptor. The term "write-back" is intended to mean how the end station 12 changes the descriptor type after it has completed descriptor processing when normal mode is selected for current receive queue r.

TABLE 2

| Descriptor type | Action | Write-back |
| --- | --- | --- |
| Frame Start (FSTART) | No space left in receive queue. Storage of received frame is aborted. Warning level interrupt (not shown) is set to indicate frame lost. When there is next reception for the queue this descriptor is processed again. | Not changed |
| Frame Middle (FMID) | Same as FSTART | Not changed |
| Frame End (FEND) | Same as FSTART | Not changed |
| Frame Single (FSINGLE) | Same as FSTART | Not changed |
| Link (LINK) | Move to next descriptor as pointed by descriptor pointer 67 (FIG. 5) | LEMPTY |
| Fixed Link (LINKFIX) | Same as LINK | Not changed |
| End Of Set (EOS) | Software-defined stop point reached. When this happens within a split frame (write of FMID, FEND), storage is aborted. Queue full interrupt (not shown) in SFR 41 signals that frame lost. When this happens at frame start (write of FSTART, FSINGLE), frame storage starts at next descriptor. In both cases there is a move to next descriptor in chain. | EEMPTY |

TABLE 2-continued

| Descriptor type | Action | Write-back |
| --- | --- | --- |
| Frame Empty (FEMPTY) | Descriptor is available for receive data storage. Up to the number of bytes specified in data size 69 (FIG. 5) will be stored to descriptor data area. | FSTART, FMID, FEND or FSINGLE |
| Frame Empty Incremental Start (FEMPTY_IS) | Descriptor is available for receive data storage. All remaining frame data bytes will be stored to incremental data area. Descriptor pointer 67 (FIG. 5) defines the base of the incremental data area. | FEND or FSINGLE |
| Frame Empty Incremental Continue (FEMPTY_IC) | Descriptor is available for receive data storage. All remaining frame data bytes will be stored to incremental data area. Descriptor pointer 67 (FIG. 5) is read undefined but is written-back with the start position inside the incremental data area after processing | FEND or FSINGLE |
| Frame Empty No Data storage (FEMPTY_ND) | Descriptor is available for receive data storage. Up to the number of bytes specified in data size 69(FIG. 5) will be taken from Rx-FIFO 56 but not stored. Data size 69 (FIG. 5) is written-back as 0 after processing. | FSTART, FMID, FEND or FSINGLE |
| Link Empty (LEMPTY) | Same as FSTART | Not changed |
| EOS Empty (EEMPTY) | Same as FSTART | Not changed |

Reception Process

Referring to FIG. 4, after initialization, the end station 12 is able to receive frames 9 via the MAC 41, select a proper receive queue $20_0, 20_1, \ldots, 20_r$ and store the received frame in a descriptor chain in system memory 13. As long as the CPU 16 provides sufficient number of empty descriptors, received frames can be stored in system memory 13.

As hereinbefore described, frames 9 received by the MAC 41 are classified during reception and stored in the Rx-FIFO 56. The Rx-FIFO 56 decouples frame reception by the MAC 41 from frame storage in system memory 13. Only information which will be used later for system memory storage will be stored in the Rx-FIFO 56. Thus, truncation and frame discarding is done when storing data in the Rx-FIFO 56.

The following information is stored in Rx-FIFO 56, namely MAC status of received frame 9, length of received frame 9, timestamp of received frame 9, target receive queue and received frame data.

When there is at least one complete frame in Rx-FIFO 56, store process is triggered for a receive queue.

If there is at least one empty frame data descriptor found in the triggered receive queue, frame storage starts. When the queue is already full (no empty frame descriptor or UFC stop level reached), the frame will be removed from Rx-FIFO 56. Accordingly, one full queue does not block storage to other queues.

—Storage of Frame Data to Descriptor Data Area—

Referring to FIGS. 4, 5 and 10, the end station 12 can effect frame storage in two ways, namely the whole frame data 61 fits into descriptor data area 64 (in which case, the stored frame data is handled by a FSINGLE descriptor) and frame data 61 is bigger than descriptor data area 64 and needs to be split (in which case the stored frame data is handled by FSTART and optionally FMID and FEND descriptors).

When the CPU 16 processes reception, it steps through the descriptor chain updated by end station 12. If and how the CPU 16 is informed about descriptors to be processed and how the CPU 16 writes-back descriptors after processing depends on the chosen hardware/software synchronization mechanism.

The end station 12 updates the descriptor type 66 as the last step of storage element handling so a descriptor with a descriptor type 66 assigned to software usage can be consistently accessed by the CPU 16.

After processing a storage element 62 and using normal synchronization mode, the CPU 16 can directly write the descriptor type 66 to an FEMPTY descriptor. After writing the descriptor type 66 to the FEMPTY descriptor, the CPU 16 does not modify any (other) part of the descriptor 63 or the descriptor data area 64.

Except when the end station is operating in no write-back mode, the CPU 16 also refreshes the size of frame data field 69 which was updated during storage. The other descriptor fields need only to be updated on application demand.

Storage as Single Frame

In a FSINGLE descriptor, the whole frame is located in one continuous system memory location at a position the CPU 16 has specified in the descriptor pointer field 67. The size of frame data field 69 provides information about the received frame length.

The end station 12 stores FSINGLE descriptors to FEMPTY or FEMPTY_ND descriptor when the size of frame data field 69 give a value which is greater than the received frame size and to FEMPTY_IS or FEMPTY_IC descriptors. The FEMPTY_IS and FEMPTY_IC descriptors cover frame data or all remaining frame data in Rx-FIFO 56.

Storage as Split Frame

Split frames can be handled by the CPU 16 in the same manner as single frames. The CPU 16, however, may need to assemble the split data before processing by higher-level software.

A descriptor truncation field (not shown) can be set in all descriptors of a split frame to the same value if frame is truncated. A descriptor error field (not shown) is set in the descriptor in which an error is detected. The CPU 16 handles a complete frame as being corrupted independently of which part of a split frame is marked as faulty.

When the end station 12 splits a received frame between different descriptors, it handles each storage element 62 separately and assigns it for software usage after it has been handled. This allows the CPU 16 to locate an incomplete frame (FEMPTY instead of FMID or FEND) during descriptor chain processing. In such a case, the CPU 16 postpones processing of the incomplete frame until the next trigger point.

No Data Storage

There may be occasions when part of a received frame is not of interest to the CPU 16. For example, this may occur when an application needs stream data, but not the header portion included in Ethernet frame. By using split frame storage, the unwanted part of the Ethernet frame 9 can be isolated.

If the CPU 16 does not use the isolated frame part at all, then this part can be excluded using a FEMPTY_ND descriptor and, thus, prevent the unused data from being stored in system memory 13. Because no data is stored, no bandwidth is required on internal data busses in the microcontroller 10 for storage of unwanted data. Thus, overall performance can be increased.

When the end station 12 updates a FEMPTY_ND descriptor, the descriptor size of frame data field 69 is set to 0. The size of frame data field 69 being set to 0 is a unique indication of a written FEMPTY_ND descriptor.

Frame Truncation

It is possible to configure the maximum number of bytes allowed for a frame so as to restrict the received frame length before storing in system memory 13. The end station 12 supports different configurations for the maximum frame length in a reception truncation configuration register (not shown) in the SFR 45. For each receive queue r, one of the truncation configuration registers can be selected.

When a received frame exceeds the selected maximum frame length, only the selected maximum frame length number of bytes is stored in system memory 13. An error interrupt (not shown) informs the CPU 16 of truncation. Additionally, the descriptor truncation field (not shown) is set to inform the CPU 16 which frame was truncated. Because truncation selection is queue specific, the CPU 16 ensures that queue selection has been done before truncation can happen. The maximum frame length may be configurable in multiples of 4 bytes.

—Incremental Data Area—

To store received data, the CPU 16 reserves an amount of system memory 13 for storage. As mentioned hereinbefore, header data 53 (FIG. 4) and payload data 54 (FIG. 4) can be stored separately.

Figure 11:
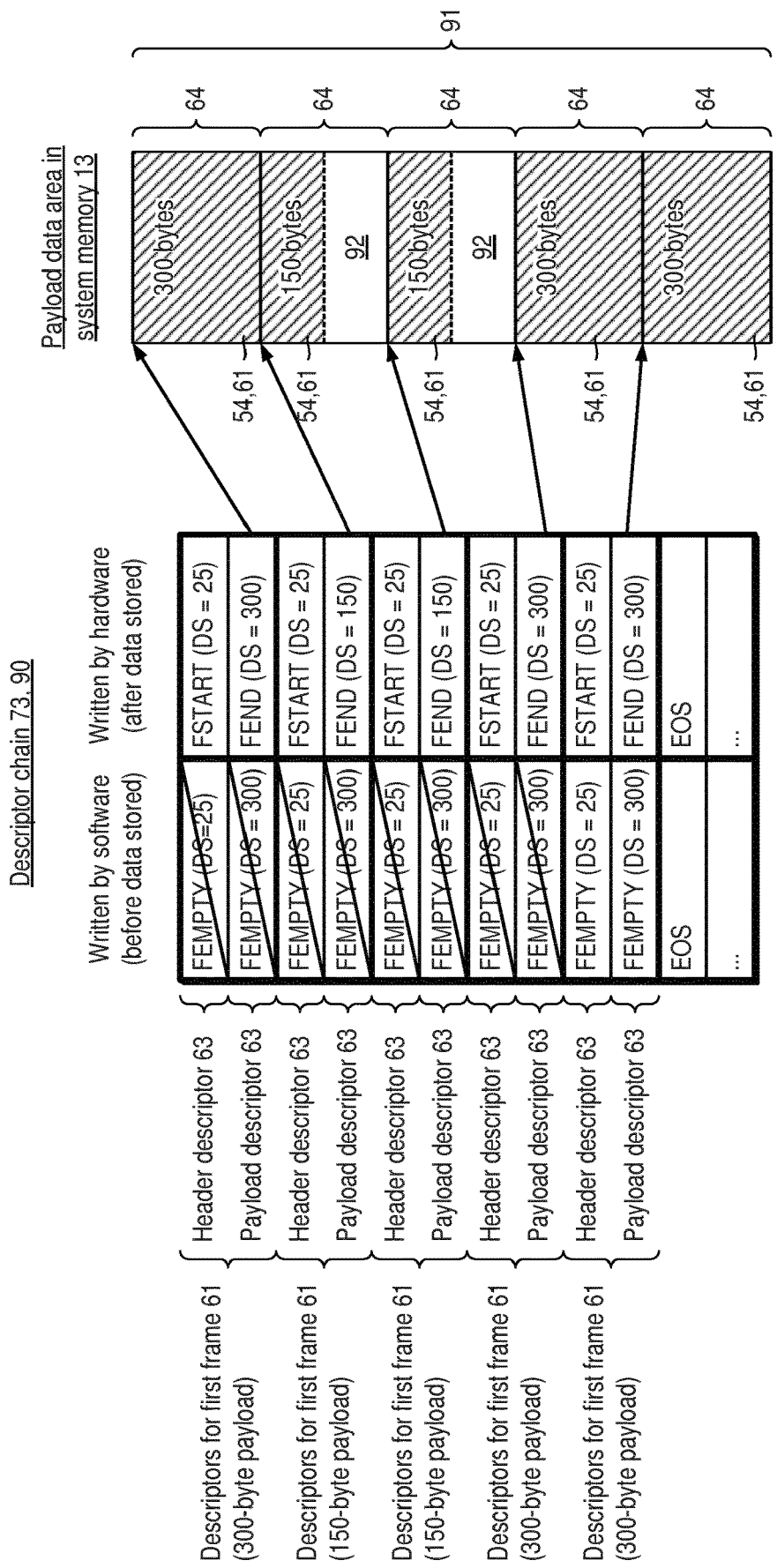
FIG. 11 illustrates arrangement of a receive queue using individual data areas.

Referring to FIG. 11, even if the descriptor data areas 64 of all storage elements in chain is located in a continuous system memory area 91, if the payload data 54 of the received frames 9 are shorter than the provided descriptor data area 64, then there will be gaps 92.

In some applications, a continuous data area, in which data is stored contiguously without gaps, may be helpful, for example, when received data are processed by other hardware, such as audio-video codec module (not shown). When received frames have different length, for example due to there being one or two audio-video packages in payload, the use of static descriptor pointers results in gaps 92 in the data area 91. Thus, CPU 16 may need to perform additional processing (such as data copying) to remove gaps.

To minimize or avoid the need for the CPU 16 to copy data, the end station 12 supports an incremental data area function.

Figure 12:
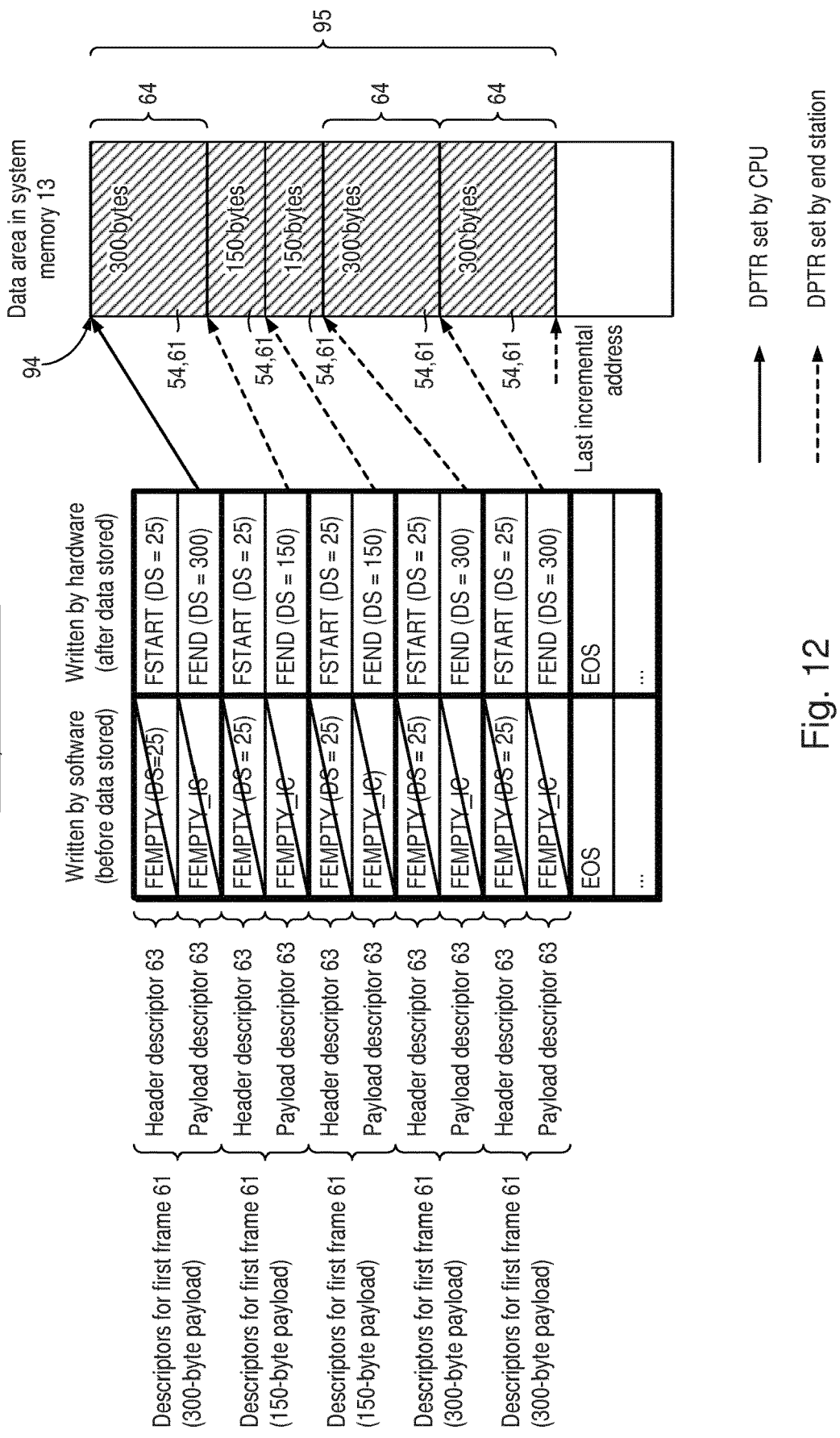
FIG. 12 illustrates arrangement of a receive queue using a common data area.

Referring to FIG. 12, when using incremental data area, different descriptors 63 use a single, common data area 95 (herein also referred to as "incremental data area") for storage of, for example, payload data 54. A descriptor, FEMPTY_IS, defines the base address 94 of the incremental data area 95, which is used by the descriptor and the following descriptors, FEMPTY_IC, in a descriptor chain 96 to store the received data.

Use of an incremental data 95 area does not reduce the amount of system memory 13 that is reserved in respect to individual descriptor data areas. There is no change is hardware/software synchronization strategies. Splitting a frame into different descriptors, for example, one for Ethernet header and one for payload data, is possible.

The arrangements shown in FIGS. 11 and 12 illustrate descriptor chains 73 using individual or incremental data areas. Each chain 73 is configured to store received frames consisting of, for example, a 25-byte header 53 which is handled by a header descriptor and a 150- or 300-byte payload 54, depending on data source, e.g. if one or two 150-byte payload packages are sent in one Ethernet frame 9.

The EOS descriptor 63, 97 is an example of a re-synchronization point. In case the frame source transmits frames more than 325 bytes, the frame is split between three descriptors so the sequence of header and data is out-of-sync. Because frames are not split across an EOS, such out-of-sync is self-healing without software interaction. When using incremental data area, EOS is not required because an incremental descriptor stores all remaining frame data.

When the end station 12 stores data in an incremental data area 95, it updates (unless it is in no write-back mode) the descriptor pointers 67 of the FEMPTY_IC descriptors. The resulting FEND or FSINGLE descriptor have the same format as the FEMPTY descriptors after writing of the FEMPTY descriptors.

Before an FEMPTY_IS is processed, the current incremental address (CIARr.CIA) in the SFR 45 is stored in a last incremental address (LIARr.LIA) in the SRF 45 for the $r^{th}$ queue to keep the top of the incremental data area information for software usage.

The application software can receive the received data in the incremental data area 95 in a compact block. All gaps are collected at the end of incremental data area.

If a packed incremental data area flag for the queue in the reception queue configuration register in the SFR 45 is reset (i.e. 0b), then the incremental data area is restricted to frame storage in multiples of four bytes. Thus, there will still be gaps of between one and three bytes if the received data to be written to incremental data area is not a multiple of 4 bytes. The CPU 16 can check length of data 66 to learn about gaps.

If packed incremental data area flag for the queue (not shown) is set (i.e. 1b), there is no restriction about frame start position inside incremental data area. Thus, there are be no gaps between frames.

Setup of Incremental Data Area

If there are N descriptors in a descriptor chain, i.e. one FEMPTY_IS descriptor and N-1 FEMPTY_IC descriptors, referring to an incremental data area, the CPU 16 reserves N-times the maximum amount of stored received data to incremental data area. By selecting the truncation selection bits (not shown) in a reception queue configuration register (not shown) and a proper maximum frame size (not shown)

for truncation, then an overflow of the incremental data area due to unexpected reception can be avoided.

As shown in FIG. 12, the description pointer 67 of the FEMPTY_IS descriptor 63 defines the base address 94 of the incremental data area 95. The following FEMPTY_IC descriptors in chain indicate the processing steps where data is to be stored in incremental data area.

The CPU 16 cannot directly restrict the amount of received data stored by an incremental descriptor, namely FEMPTY_IS, FEMPTY_IC, as this is possible for other descriptors, namely FEMPTY and FEMPTY_ND, by the data size field 69. Even if the received frame size is known, it is recommended to use truncation function as hereinbefore described, to prevent an overflow of the incremental data area.

Processing Incremental Data Area Based on Descriptors

Data processing by the CPU 16 is the same irrespective of store mechanism by the end station 12 and so there is no need to handle data stored in incremental data area differently.

This processing scheme can be used in normal mode, i.e. in which full descriptor write back, and keep-descriptor-type mode (keep DT mode), i.e. in which there is no update of the descriptor type field 66 at descriptor write back. In no write-back mode, i.e. no descriptor write back, the stored data size is not available and so the CPU 16 needs information about the stored size based on system knowledge (when only a fixed frame size is generated by frame source).

Processing Incremental Data Area Based on Address Pointers

When using incremental data area, the CPU 16 can process received data independently from the descriptors itself. For this the end station 12 provides the current incremental address CIARr.CIA and the last incremental address LIARr.LIA) stored in the SFR 45. Using these values and a software-processed address pointer ("SWdptr"), the amount of data in incremental data area can be calculated.

Because the amount of stored data can be calculated based on addresses, the size information provided in the data size field 69 is not required. This allows no write-back mode to be used even if the received frame size is not known. When the packed incremental data area for the $r^{th}$ queue r is reset (i.e. to 0b) there may be a gap of up to three bytes after a frame and so software takes them into account.

Figure 13:
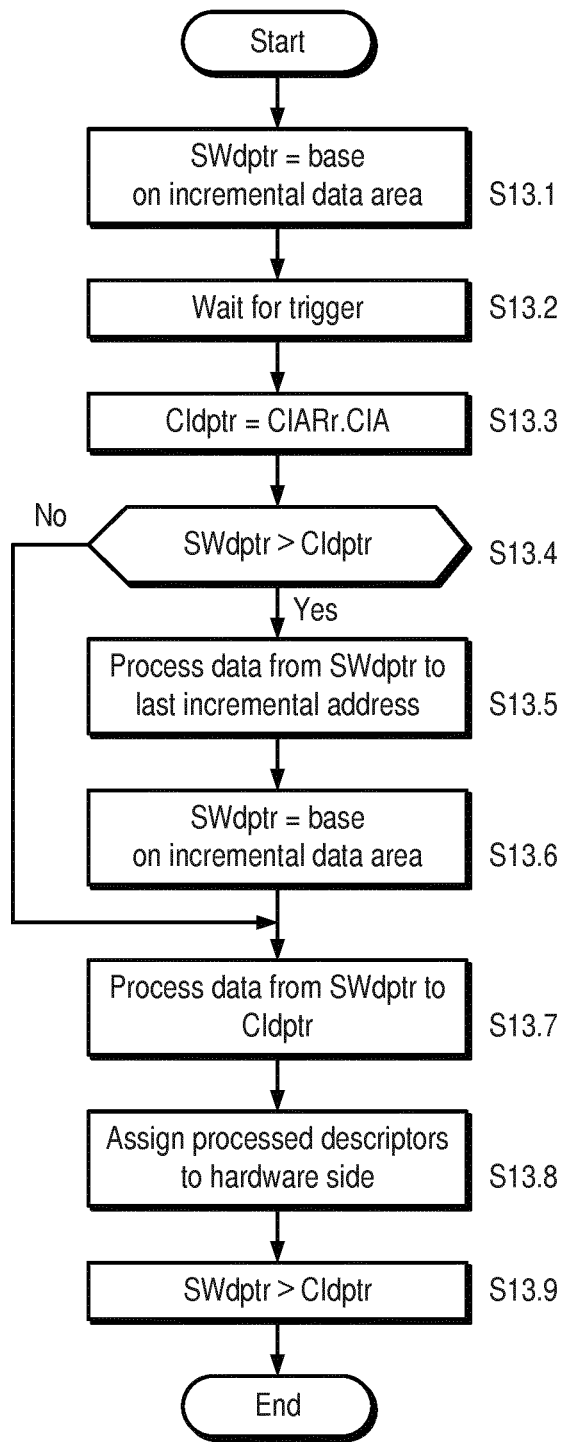
FIG. 13 is a process flow diagram of a method, performed by software, to process incremental data area.

Referring to FIG. 13, when software is triggered (step S13.2), it checks the three addresses to localize the data to be processed. The following scenarios can be handled, namely:

SWdptr=CIARr.CIA: nothing stored in incremental data area

SWdptr<CIARr.CIA: new data available; process data between both positions

SWdptr>CIARr.CIA: New data available; hardware has wrapped to base of incremental data area at FEMPTY_IS descriptor (under the assumption that the descriptor chain contains a FEMPTY_IS descriptor that points back to the base of incremental data area); process data between SWdptr and last incremental address (not shown) (i.e. data stored before FEMPTY_IS) and data between base and CIARr.CIA (i.e. data stored by/after FEMPTY_IS).

The end station 12 may be ahead in reading descriptor and processing the descriptor data to that of the one related to current CIARr.CIA value, this can happen when write responses are delayed in system. If the end station 12 has wrapped back to base of incremental data area, then there is possibility that the end station 12 is writing new data to area which is yet to be processed by software. Depending upon system response, this could be up to 5 frames.

The CPU 16 receives a trigger, which is application specific, for example, reception warning interrupt, descriptor processed interrupt or software timer. If the start and end addresses are the same, then no processing is carried out in steps S13.5 and S13.7.

After processing a received frame data, the hardware/software synchronization mode dependent action is performed by the CPU 16 (step S13.8). In keep DT and no write back modes, there is no update of descriptor type by the CPU 16.

—Processing Descriptor Chain in Normal Mode—

The software models the descriptor chain handling. A software descriptor pointer variable (not shown) identifies the descriptor to be processed. When OPERATION mode is entered and when the load base address function is used, the software descriptor pointer variable (not shown) is initialized to indicate start condition of flow.

A frame processing function (not shown) processes the storage element. The function (not shown) derives whether a frame is complete from a software descriptor pointer type variable (not shown).

—Keep DT Mode—

The keep DT mode of the end station 12 can be used to reduce CPU updates to descriptors if received frames are of a fixed format or incremental data area is used. This mode is selectable for each receive queue using a receive synchronization mode value in the reception queue configuration register (not shown) stored in the SFR 45. The end station 12 does not update descriptor type field, but all other descriptor fields are updated.

In this mode of operation, descriptor type field of descriptors for that queue are not modified by the end station 12 after processing. This means that the CPU 16 does not need to prepare descriptors again. Hardware/software synchronization can be achieved by using UFC unread frame counter 51 or by using a descriptor interrupt to determine trigger points.

Example of Using Keep DT Mode with Cyclic Chain

Figure 14:
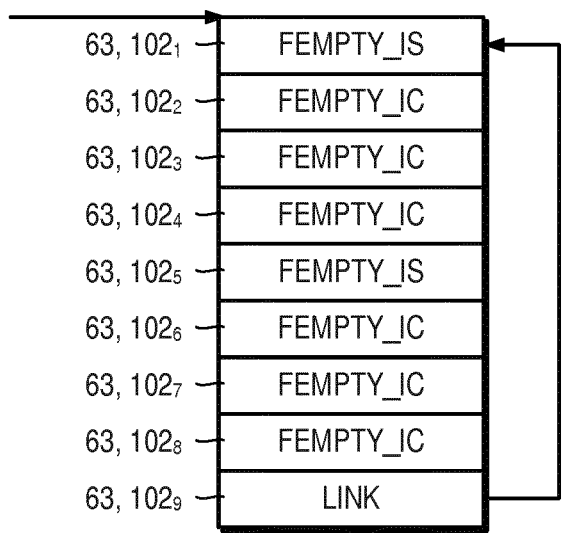
FIG. 14 illustrates a cyclic chain in a keep-the-descriptor-type mode.
Figure 15:
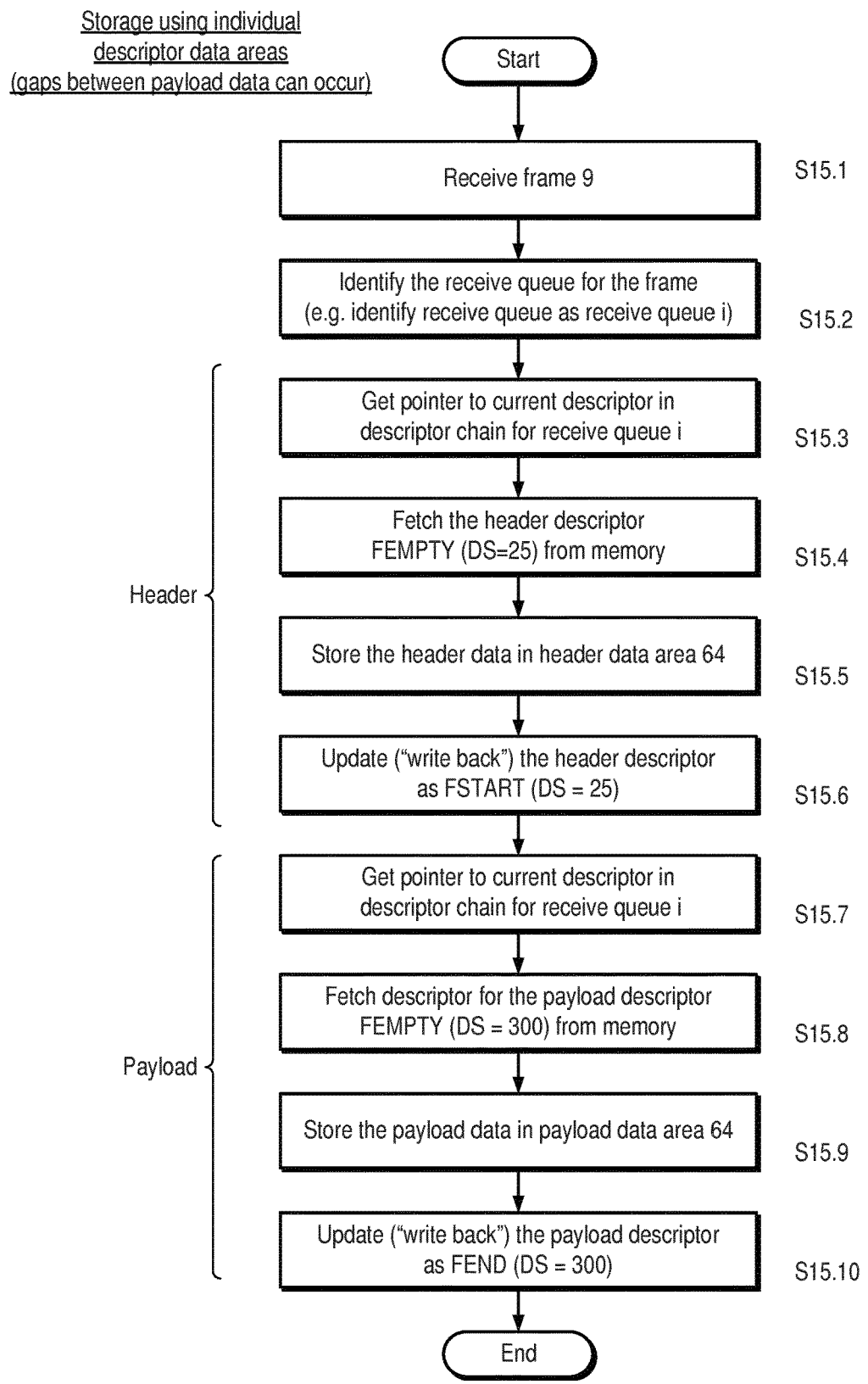
FIG. 15 is a process flow diagram of a method of storing data using individual descriptor data areas.
Figure 16:
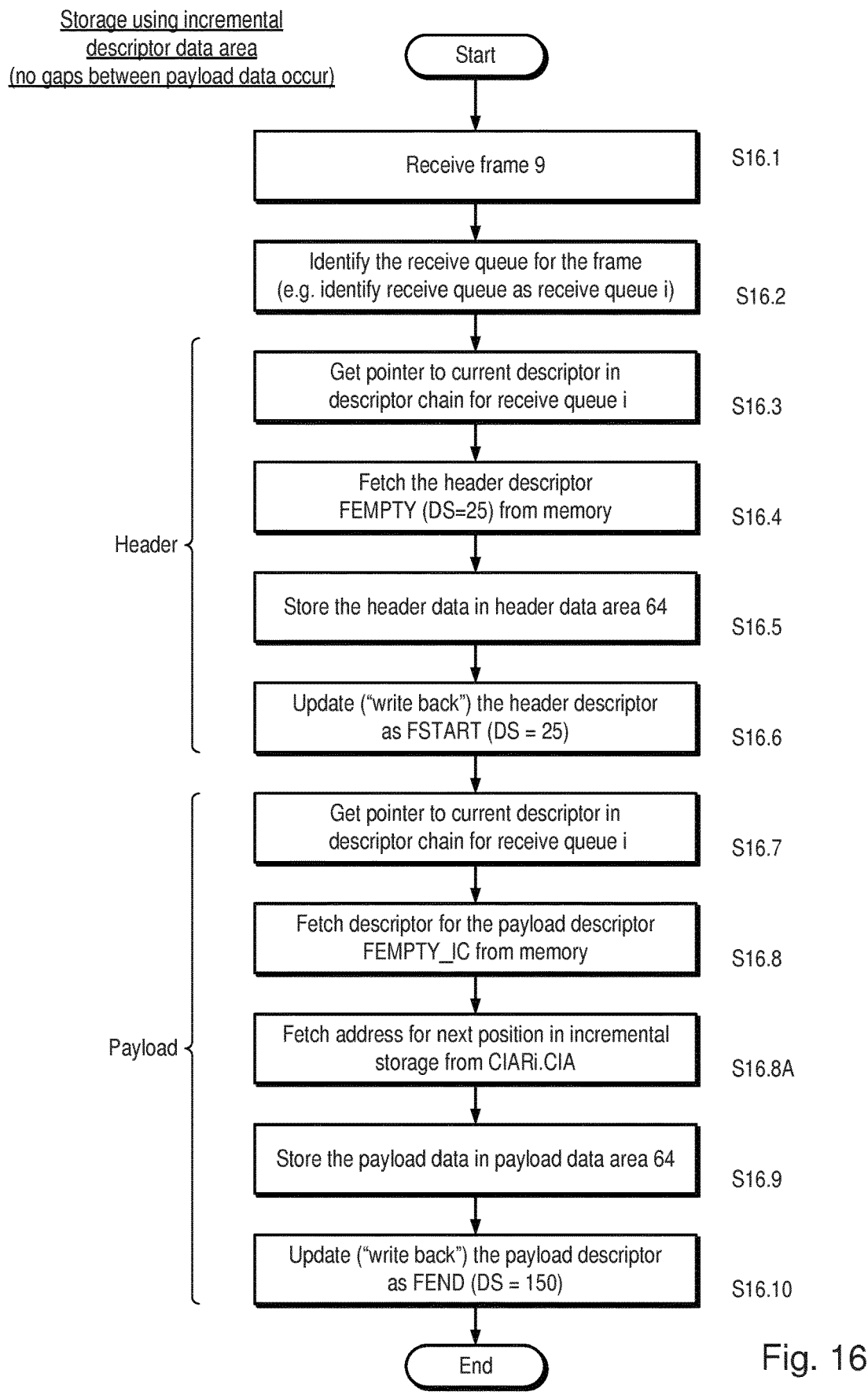
FIG. 16 is a process flow diagram of a method of storing data using a common incremental data area.

Referring to FIG. 14, a descriptor chain 73, 101 is shown using incremental area to be processed in keep DT mode. Because the descriptor data size is judged to "Don't care" for FEMPTY_IS and FEMPTY_IC descriptors there is no requirement for the CPU 16 to refresh descriptors since the CPU 16 has full knowledge about stored data.

Acyclic chain of, for example, eight descriptors 63 is able to save up to eight frames before a queue is full. In the case of typical Ethernet frames, the total size of incremental data area should be 8×1500 bytes. Truncation can be used to avoid overflow.

Two incremental areas, FEMPTY_IS in first and fifth descriptors $102_1$, $102_5$ are used to prevent overwrite inside a data area due to different frame length.

To have correct setup of incremental data area after start up, the first descriptor $102_1$ of the chain 101 is FEMPTY_IS. In keep DT mode, there is no difference between LINK and LINKFIX descriptors. In this case, LINK is chosen.

To prevent overwrite, a UFC stop level function (not shown) is used. The stop level is configured to be 4 which is the same as the minimum number of available descriptors in one incremental data area. In this example, each descriptor stores one complete frame and no splitting occurs.

Some applications may want to limit number of interrupt notifications. UFC warning level supports this. To avoid queue full situation, the warning level may be set to two.

This allows storage of up to 2 additional frames in case software is not able to handle the interrupt in time.

When software processes a received frame, it can use descriptor area size, as well as processing based on incremental data area addresses herein before described. Based on the number of processed frames, software is able to determine the descriptor to be processed. Using descriptor interrupt enable, there is information about corrupted data in the incremental data area.

—No Write-Back Mode—

From the perspective of hardware/software synchronization, no write-back mode is the same as the keep DT mode hereinbefore described.

Because the descriptor is not updated after frame storage, information about errors and the number of stored data bytes is not provided by the end station 12 in this mode. Thus, the CPU 16 needs to know the frame format expected to be received.

There are two ways that the CPU 16 can determine the received frames. First, the UFC provides information about the number of received frames available in the queue. When the frame format is fixed, the number of bytes in the descriptor data area is known. Secondly, when storing data in the incremental data area, available received data can be determined by address pointers.

Because of limited information about received frames, it is preferred to perform a new setup of the receive queue and handling software when an issue is detected. This can help to ensure a proper resynchronisation of hardware and software. Evaluation of received data based on descriptor area size and interrupt enable is not possible.

—Reception Timestamp Support—

Reception timestamp provision is important for IEEE 802.1AS time synchronization. Other type of reception frames may benefit from a reception timestamp.

Referring to FIG. 4, the end station 12 provides support for reception timestamp based on a gPTP timer by storing the related timestamp, captured at the occurrence of start of frame delimiter (SFD) of the received frame by detector 45, into the last frame data descriptor, FEND, FSINGLE.

When timestamp storage is required, extended descriptors can be used for the whole receive queue.

Unread Frame Counter

The end station has support for hardware/software synchronization besides normal access synchronization using descriptor type. This support is required when descriptor type is not available for hardware/software synchronization, for example, in keep DT and no write-back modes. To support special application requirements, unread frame counters can also be used when using normal synchronization mode, i.e. full descriptor write back mode.

Each reception queue has an individual unread frame counter 58. The counter value of each reception queue is readable by an unread frame counter value register in SFR 45. All of the unread frame counter share a common. This configuration is determined by unread frame counter configuration bits (not shown) in the reception queue configuration register (not shown) in the SFR 45.

Unread frame counter function is based on interaction with the end station 12 (on the hardware side) and by the CPU 16 (on the software side). The hardware side informs unread frame counter 58 that a new frame is available in descriptor chain, i.e. hardware increment. The software side informs the unread frame counter 58 how many frames were processed from descriptor chain, i.e. software decrement.

The unread frame counter 58 is based on stored frames in system memory 13 and is independent of number of descriptors used for frame storage. Thus, it is incremented by one even when a received frame is split through different descriptors. The unread frame counter 58 increments even when FEMPTY_ND descriptor is used.

The queue specific unread frame counter 55 provides the current unread frame counter value (not shown) in the SFR 45 and information about a warning level and a stop level. The end station 12 uses the warning level reached information to set a receive warning flag (not shown) in the SFC 45. This flag is set (to 1b) when the unread frame counter value reaches a selected warning level.

The stop level reached information is used to prevent storage of received frames into descriptor chain. When the selected stop level is 0, this function is disabled. A frame to be stored is dropped when the selected stop level is equal to the unread frame counter value. Frame dropping due to unread frame counter stop function is flagged by a reception interrupt status register queue full flag (not shown) in SFC 45.

While end station 12 is in a configuration mode, the CPU 16 can configure the common unread frame counter configuration registers (not shown) and select the proper configuration for all receive queues where unread frame counter support is required.

There are two principal usage scenarios of unread frame counter support which requires different software flows as described.

—Fill Level Notification—

In this scenario, the receive queue uses normal synchronization using the descriptor type. The unread frame counter 58 is used to generate a notification when a specific number of frames is available in descriptor chain. The stop level function of the unread frame counter 55 is be disabled.

When using a cyclic descriptor chain, there is no fixed relation between a descriptor position in the chain and software execution. Thus, split frames and/or processing of all currently available frames make it difficult to select dedicated descriptors for notification generation by descriptor interrupt.

Using the unread frame counter 58 helps to address this problem. The warning level interrupt (not shown) can be used to trigger software execution after reception of a given number of frames.

A software timer (not shown) can be used. If reception in a queue is infrequent, then a situation can occur when a frame or a couple of frames stored in a queue are not processed for long time because the warning level is not reached. Using a software timer (not shown) as an additional trigger can help to solve this problem.

Before the CPU 16 starts processing frames, the number of available frames (N) is read from unread frame counter. This number of frames is processed. Additional frames that are received during processing are handled with the next interrupt.

When the CPU 16 decrements the counter, the warning level interrupt is cleared when the resulting unread frame counter value falls below the used warning level. Because clearing the interrupt depends on the unread frame counter value, the interrupt request is kept active when there was reception of more than selected warning level while the CPU 16 processes the available frames.

A software timer can be used in a number of situations. For example, the software timer can be used to reduce interrupt load on the CPU 16. Received frames are processed in sets of at least ten frames. Thus, the warning level of the queue is set to ten. In another example, an application may require processing of received frames with maximum 25 ms latency. Thus, a software timer is configured to this time. By restarting the software timer when beginning processing, a maximum latency condition is always fulfilled.

—Hardware/Software Synchronization in No Write-Back Mode—

In this scenario, the receive queue is not using the normal synchronization scheme employing the descriptor type and so the CPU 16 has no information about the filled descriptors in chain. Here, the unread frame counter 58 is used to inform the CPU 16 about the number of available frames and help to avoid overwriting of storage elements not yet processed by the CPU 16.

The value in unread frame counter is used as information about the number of available frames in queue.

The stop level configured in the unread frame counter stop level register (not shown) in SFR 45 is used to prevent overwriting. The unread frame counter stop level register (not shown) should not be set to zero.

Usage of the warning level is optional and depends on application requirements. When an application wants to minimize number of receive notification interrupts, the unread frame level warning level notification can be used. Alternatively, a frame-based receive notification can be used.

CPU is Triggered by After a Set of Received Frames

This scenario is same as that hereinbefore described in relation to fill level notification. It differs, however, in that a stop level is selected the unread frame counter stop level register (not shown).

CPU is Triggered by Each Received Frame

A frame received interrupt can be used as a trigger. Thus, processing starts when at least one frame is in queue. As additional frames can be received before the CPU 16 starts processing, the unread frame counter value is used to determine the exact number of frames to be processed. The warning level function is not used.

When the CPU 16 applies a decrement to the unread frame counter decrement register (box D), the frame received interrupt is cleared when the resulting unread frame counter value is 0 (i.e. indicating that all frames in queue have been processed). Because clearing the interrupt depends on the unread frame counter value, the interrupt request remains active when there was a reception while the CPU 16 processes the available frames.

—Loading Base Address—

The unread frame counter 58 is cleared when the CPU 16 sets the load base address of the descriptor load register (not shown) to 1b. As a result, the software cannot use the unread frame counter to determine number of received frames in an old chain.

Due to data transfer times on the system level, there may be one or more frames on the way when the end station 12 changes from an old chain to a new chain. In that case, the unread frame counter 58 ignores all frames related to in the old chain. The next increment happens for the first frame in new chain. The frame received interrupt for queue r flags all received frames independent from old or new chain.

—UFC Synchronization Lost—

The following conditions can result in a synchronization loss, namely the unread frame counter 58 reaches its maximum value, incomplete storage of split frame (no FEND stored), incomplete split frames (FSTART, but no FEND) are not counted, when queue full detected because no FEMPTYxxx read, when a descriptor read is faulty.

As a result, the unread frame counter may indicate a different number of frames as really available in descriptor chain and so hardware/software synchronization may be lost. In that case, the CPU 16 can use the load base address function of the related queue to get a clean start point for operation.

Reception of Image Frames

Referring again to FIGS. 1 and 3, 4 and 5, talker end stations (not shown) in the digital cameras 3 may stream images to the listener end station 12 in the head unit 4.

The end station 12 is able to store the image data, i.e. frame data 61, in system memory 13 using the descriptor-based approach. Payload data 54 can be stored using individual descriptor data areas or using common incremental data areas depending on how software has set up the descriptors.

To illustrate the difference between using individual descriptor data areas or using common incremental data, an example in which processing of payload data 54 which is 150 bytes long and data areas 64 which are 300 bytes long will be used.

It will be appreciated, however, that data size DS will vary according to the size of frame data 61 stored and to the size of data area 64 allocated.

Storage Using Individual Descriptor Data Areas

Referring to FIGS. 4, 5, 11 and 15, a process of storing header data 53 and payload data 54 contained in received frames 9 using individual descriptor data areas 64 will now be described.

The message handler 42 receives a frame 9 from the MAC 41 (step S15.1). The message handler 42 classifies the frame 9 according to frame type and/or frame content and, in response to identifying that the frame matches a given frame type and/or given frame content, selects a queue i (step S15.2).

The message handler 42 first processes the header data 53, which may be the header 23 of the Ethernet frame 9. In this case, the message handler 42 stores the header data 53 since the descriptor type is FEMPTY, as defined by software. However, the message handler 42 can discard the header data 53 if instructed to by software, by setting the descriptor type to FEMPTY_ND.

The message handler 42 accesses CDARi.CIA to obtain the pointer to the current descriptor 63 in the descriptor chain 73 for the $i^{th}$ queue (step S15.3). The message handler 42 then automatically updates CDARi.CIA to point to the next descriptor in the chain.

The message handler 42 fetches the descriptor 63 for the header data 53, which is currently set as FEMPTY (DS=25) which allocate 25 bytes for the header data 53 (step S15.4). Using DPTR, the message handler 42 stores the header data 53 in the data area for the header data for the $i^{th}$ queue (step S15.5). This is not shown in FIG. 11.

The message handler 42 then updates ("writes back") the descriptor 63 to FSTART (DS=25) which allows the header data to read (step S15.6).

The message handler 42 then processes the payload data 54.

The message handler 42 accesses CDARi.CIA to obtain the pointer to the current descriptor in the descriptor chain for the $i^{th}$ queue (step S15.7). Again, the message handler 42 then automatically updates CDARi.CIA to point to the next descriptor in the chain.

The message handler 42 fetches the descriptor 63 for the payload data 54, which is currently set to FEMPTY (DS=300) (step S15.8). This indicates that a data area 64 is available for storing the payload data 54 and that species the amount of memory (in this case 300 byte) available for storage. Using DPTR, the message handler 42 stores the payload data 54 in the data area 64 for the payload data for the $i^{th}$ queue (step S15.9).

The message handler 42 then updates the payload descriptor 63 to FEND (DS=300) (step S15.10). The message handler 42 updates CIARi.CIA by incrementing it by 300 (i.e. to the next individual descriptor data area) and LIARi.LIA is updated by setting it to have the same value as CIARi.CIA.

As shown in FIG. 11, if payload data 54 is only 150 bytes long, but the individual data areas 64 are 300 bytes long, then gaps 92 of unused memory will appear.

Storage Using Common Incremental Data Areas

Referring to FIGS. 4, 5, 12 and 15, a process of storing the header data 53 and payload data 54 using incremental data area will now be described.

The message handler 42 receives a frame 9 from the MAC 41 (step S16.1). The message handler 42 classifies the frame 9 according to frame type and/or frame content and, in response to identifying that the frame matches a given frame type and/or given frame content, selects a queue i (step S16.2).

The message handler 42 processes the header of the frame in the same way as using individual descriptor data areas hereinbefore described and so will not be described again here (steps S16.3 to S16.6).

The message handler 42 then processes the payload data 54.

The message handler 42 accesses CDARi.CIA to obtain the pointer to the current descriptor in the descriptor chain for the $i^{th}$ queue (step S16.7). The message handler 42 automatically updates CDARi.CIA to point to the next descriptor in the chain.

The message handler 42 fetches the descriptor 63 for the payload data 54, which is currently FEMPTY_IS (step S15.8). This indicates that incremental storage should be used. The message handler 42, notified by that incremental storage should be used, accesses CIARi.CIA to obtain the address to continue incremental storage (S16.8A).

The message handler 42 stores the payload data 54 in the data area 64 for the payload data for the $i^{th}$ queue (step S16.9).

The message handler 42 then updates the payload descriptor 63 to FEND (DS=150) (step S16.10). CIARi.CIA is updated by incrementing it by 150 and LIARi.LIA is updated by setting it to have the same value as CIARi.CIA.

As shown in FIG. 12, if payload data 54 is only 150 bytes long, but the incremental storage is used, then data 54 is stored contiguously in the memory reserved for the payload data for the queue, without any gaps 92.

Modifications

It will be appreciated that many modifications may be made to the embodiments herein before described. Such modifications may involve equivalent and other features which are already known in the design, manufacture and use of microcontrollers, communication network controllers, memory systems or parts thereof and which may be used instead of or in addition to features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A communications network controller module comprising:
   a media access controller; and
   a message handler implemented in an integrated circuit;
   wherein the message handler is configured, in response to receiving a frame comprising frame data from the media access controller, the frame data comprising header frame data and payload frame data,
      to identify a frame type for the frame,
      to identify a target queue in dependence upon the frame type, the target queue comprising a series of data areas in memory reserved for storing frames of the frame type,
      to obtain a current descriptor address of a current descriptor for the target queue, the current descriptor comprising a descriptor type field,
      to obtain a first address in the series of data areas and to store the payload frame data at the first address, and
      to obtain a second address in a header data area in the series of data areas and to store the header frame data at the second address;
   wherein the message handler is configured, in dependence upon determining that a descriptor type held in the descriptor type field indicates the payload frame data is to be stored contiguously in the series of data areas,
      to obtain the first address at which to store the payload frame data by reading the first address from a current incremental address register for the target queue,
      to obtain the second address at which to store the header frame data by reading the second address from the current incremental address register for the target queue,
      to process the header frame data using a header descriptor and to process the payload frame data using a payload descriptor wherein the payload descriptor is different to the header descriptor, and wherein the header frame data comprises all header data of the frame, and
      to store the payload frame data contiguously in the series of data areas and, in response to the header descriptor instructing the message handler to store the header frame data, to store the header frame data in the header data area for the target queue.

2. A module according to claim 1 wherein the message handler is configured to write a new frame type to the descriptor type field.

3. A module according to claim 1, wherein the message handler is configured to store the first address in last incremental address register for the target queue.

4. A module according to claim 1, wherein the message handler is configured to write a new first address in the current incremental address register for the target queue to point immediately after an end of the payload frame data so as to allow a next payload frame data to be stored contiguously after the payload frame data.

5. A module according to claim 1, wherein the current descriptor address is obtained from a current descriptor address register for the target queue which points to the current descriptor, and the communications network controller module is configured, after obtaining the current descriptor address from the current descriptor address register, to update the current descriptor address register to point to a next descriptor.

6. A module according to claim 1, wherein the frame is an Ethernet frame.

7. A module according to claim 6, wherein the Ethernet frame complies with IEEE 1722 Audio/Video Bridging Transport Protocol.

8. A module according to claim 1, wherein the data frame is a TCP/IP frame.

9. A module according to claim 1, wherein the processing of the header frame data using a header descriptor and the processing of the payload frame data using a payload descriptor further comprises:
   the message handler fetching the header descriptor for the header frame data and allocating memory in the header data area for the header frame data based on the descriptor for the header frame data; and
   the message handler fetching the payload descriptor for the payload frame data which includes the amount of memory available for storage in the series of data areas.

10. An integrated circuit comprising:
   a communications network controller module according to claim 1;
   a system bus; and
   a central processing unit sub-system in communication with the communications network controller module via the system bus.

11. An integrated circuit according to claim 10, which is a microcontroller, a system on a chip or an application specific integrated circuit.

12. An integrated circuit according to claim 10, further comprising:
   memory.

13. A computer system comprising:
   a first integrated circuit according to claim 10; and
   a second, different integrated circuit providing memory in communication with the first integrated circuit.

14. A control unit comprising:
   an integrated circuit according to claim 10; or
   a computer system according to claim 13.

15. A system according to claim 14 further comprising:
   at least one display coupled to the control unit for displaying.

16. A system comprising:
   a control unit according to claim 14;
   at least one data source;
   a communications network arranged to carry data from the at least one data source to the control unit.

17. A vehicle comprising a system according to claim 16.

18. A method comprising:
   identifying a frame type for a frame comprising frame data, the frame data comprising header frame data and payload frame data;
   identifying a target queue in dependence upon the frame type, the target queue comprising a series of data areas in memory reserved for storing frames of the frame type;
   obtaining a current descriptor address of a current descriptor for the target queue, the current descriptor comprising a descriptor type field;
   obtaining a first address in the series of data areas and storing the payload frame data at the first address;
   obtaining a second address in a header data area in the series of data areas and storing the header frame data at the second address;
   in dependence upon determining that a descriptor type held in the descriptor type field indicates the payload frame data is to be stored contiguously in the series of data areas, obtaining the first address at which to store the payload frame data by reading the first address from a current incremental address register for the target queue,
   obtaining the second address at which to store the header frame data by reading the second address from the current incremental address register for the target queue;
   processing the header frame data using a header descriptor and processing the payload frame data using a payload descriptor wherein the payload descriptor is different to the header descriptor, wherein the header frame data comprises all header data of the frame; and
   storing the payload frame data contiguously in the series of data areas and, in response to the header descriptor instructing the message handler to store the header frame data, to store the header frame data in the header data area for the target queue.

\* \* \* \* \*